US009301070B2

(12) United States Patent
Fonseca, Jr. et al.

(10) Patent No.: US 9,301,070 B2
(45) Date of Patent: Mar. 29, 2016

(54) SIGNATURE MATCHING OF CORRUPTED AUDIO SIGNAL

(71) Applicant: General Instrument Corporation, Horsham, PA (US)

(72) Inventors: Benedito J. Fonseca, Jr., Glen Ellyn, IL (US); Kevin L. Baum, Rolling Meadow, IL (US); Faisal Ishtiaq, Chicago, IL (US); Jay J. Williams, Glenview, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 306 days.

(21) Appl. No.: 13/794,753

(22) Filed: Mar. 11, 2013

(65) Prior Publication Data

US 2014/0254807 A1 Sep. 11, 2014

(51) Int. Cl.

*H04R 29/00* (2006.01)
*G06F 17/00* (2006.01)
*H04H 60/37* (2008.01)
*G10L 25/54* (2013.01)
*H04H 60/58* (2008.01)
*G10L 21/0208* (2013.01)

(52) U.S. Cl.

CPC ................ *H04R 29/00* (2013.01); *G10L 25/54* (2013.01); *H04H 60/37* (2013.01); *H04H 60/58* (2013.01); *G10L 2021/02087* (2013.01); *H04H 2201/90* (2013.01)

(58) Field of Classification Search

CPC .................... G11B 20/00123; H04H 2201/90; H04H 60/37; H04H 60/58; G06K 9/00496; H04R 29/00; G10L 2021/02087; G10L 25/54

USPC ...................... 381/56, 77, 58; 700/94; 725/18

See application file for complete search history.

(56) References Cited

U.S. PATENT DOCUMENTS

| | | | |
|---|---|---|---|
| 5,481,294 | A | 1/1996 | Thomas et al. |
| 5,804,752 | A | 9/1998 | Sone et al. |
| 7,333,864 | B1 | 2/2008 | Herley |
| 7,650,616 | B2 | 1/2010 | Lee |
| 7,672,843 | B2 | 3/2010 | Srinivasan et al. |

(Continued)

FOREIGN PATENT DOCUMENTS

| | | | |
|---|---|---|---|
| EP | 2083546 | A1 | 7/2009 |
| GB | 2397027 | A | 7/2004 |

(Continued)

OTHER PUBLICATIONS

PCT Search Report & Written Opinion, Re: Application #PCT/US2014/022165; dated Aug. 19, 2014.

(Continued)

*Primary Examiner* — Vivian Chin
*Assistant Examiner* — Douglas Suthers
(74) *Attorney, Agent, or Firm* — Stewart M. Wiener

(57) ABSTRACT

Devices and methods that match audio signatures to programming content stored in a remote database are disclosed. In one aspect of an embodiment, audio that includes primary audio from a device that outputs media content to one or more users is analyzed, in order to identify a presence or absence of corruption, and an audio signature is generated for an interval of time. In an aspect of a further embodiment, content being watched by a user is identified using a query audio signature and a message indicating the presence or absence of corruption.

22 Claims, 16 Drawing Sheets

(56) References Cited

U.S. PATENT DOCUMENTS

| | | | |
|---|---|---|---|
| 7,793,318 | B2 | 9/2010 | Deng |
| 7,853,438 | B2 | 12/2010 | Caruso et al. |
| 7,882,514 | B2 | 2/2011 | Nielsen et al. |
| 7,928,307 | B2 | 4/2011 | Hetherington et al. |
| 7,930,546 | B2 | 4/2011 | Rhoads et al. |
| 8,015,123 | B2 | 9/2011 | Barton et al. |
| 8,076,564 | B2 | 12/2011 | Applewhite |
| 2002/0072982 | A1 | 6/2002 | Barton et al. |
| 2006/0009979 | A1 | 1/2006 | McHale et al. |
| 2008/0200224 | A1 | 8/2008 | Parks |
| 2009/0265163 | A1 | 10/2009 | Li et al. |
| 2011/0003638 | A1 | 1/2011 | Lee et al. |
| 2011/0273455 | A1 | 11/2011 | Powar et al. |
| 2012/0059845 | A1 | 3/2012 | Covell et al. |
| 2012/0195433 | A1 | 8/2012 | Eppolito et al. |
| 2014/0254806 | A1 | 9/2014 | Fonseca, Jr. |

FOREIGN PATENT DOCUMENTS

| | | | |
|---|---|---|---|
| GB | 2483370 | A | 3/2012 |
| WO | 95/17054 | A1 | 6/1995 |
| WO | 99/27668 | A1 | 6/1999 |
| WO | 02/11123 | A2 | 2/2002 |
| WO | 03/091899 | A2 | 11/2003 |
| WO | 2005/113096 | A1 | 12/2005 |
| WO | 2005118094 | A1 | 12/2005 |
| WO | 2006/115387 | A1 | 11/2006 |

OTHER PUBLICATIONS

PCT Search Report & Written Opinion, Re: Application #PCT/US2014/022166; dated Jul. 23, 2014.

SEVEN45 Studios, "Home | Soulo Karaoke", URL: www.soulo.com, accessed Jul. 1, 2013.

SEVEN45 Studios, "Soulo Karaoke", URL: itunes.apple.com/us/applsoulo-karaoke/id456339499?mt=8, accessed Jul. 1, 2013.

S. Baluja, et al., "Waveprint: Efficient wavelet-based audio fingerprinting", Pattern Recognition, vol. 41, No. 11 (2008), pp. 3467-3480.

Red Karaoke, "Red Karaoke: sing with your iPhone, Android smartphone, or Windows phone", URL: www.redkaraoke.com/apps/mobile, accessed Jun. 24, 2013.

Harmonix Music Systems Inc., "About Harmonix", URL: www.rockband.com/about, accessed Jun. 25, 2013.

Crunchbase, "TuneWiki", URL: www.crunchbase.com/company/tunewiki, accessed Jun. 25, 2013.

Informer Technologies, Inc., "Canta", URL: www.canta.software.informer.com, accessed Jun. 25, 2013.

IEENG Solution, 4Lyrics Lite—Andriod Apps on Google Play, URL: play.google.com/store/apps/details?id=it.ieeng.lyrics&hl=en, accessed Jun. 25, 2013.

Chaumet Software, "CANTA; Learn to sing in tune", URL: www.singintune.org, accessed Jun. 25, 2013.

Informer Technologies, Inc., "FollowMe—Software Informer", URL: www.followme.software.informer.com, accessed Jun. 25, 2013.

Musixmatch, "musiXmatch—The World's Largest Lyrics Catalog", URL: www.musixmatch.com, accessed Jul. 1, 2013.

Yahoo!, Inc., "IntoNow—connect with your friends around the shows you love", URL: www.intonow.com/ci, accessed Jun. 26, 2013.

Yahoo, Inc., "IntoNow—Android Apps on Google Play", URL: play.google.com/store/apps/details?id=com.intonow&h1=en, accessed Jun. 26, 2013.

Red Karaoke, RedKaraoke, the karaoke machine for iPhone, iPod touch and iPad on the iTunes app store, URL: www.itunes.apple.com/us/app/red-Karaoke-karaoke-machine-id452332418?mt=8, accessed Jun. 24, 2013.

Komani Digital Entertainment, "Konami Digital Entertainment, Inc.: Karaoke Revolution", URL: www.konami.com/games/karaoke-revolution, accessed Jun. 25, 2013.

Tunewiki, Inc., "TuneWiki Lyrics Apps", URL: www.tunkewiki.com/apps, accessed Jun. 25, 2013.

Musixmatch, musiXmatch Lyrics Player—Andriod Apps on Google Play, URL. play.google.com/store/apps/details?id=com.musixmatch.andriod.lyrify, accessed Jul. 1, 2013.

Shazam Entertainment Ltd., "Shazam for iPhone, iPod touch and iPad on the iTunes App Store", URL: itunes.apple.com/us/app/shazam/id284993459?mt=8, accessed Jun. 25, 2013.

Shazam Entertainment Ltd., "Introducing Shazam Player", URL: www.shazam.com/music/web/productfeatures.html?id=668, accessed Jun. 24, 2013.

Macworld, "Shazam Player", URL: www.macworld.com/product/1177564/shazam-player.html, accessed Jun. 25, 2013.

Xitona Software, "Singing Tutor Product—Xitona Software", URL: www.xitona.com/singingtutor.html, accessed Jun. 25, 2013.

Soundhound, Inc.,"SoundHound for iPhone, iPod touch and iPad on the iTunes App Store", URL: itunes.apple.com/us/app/soundhound/id355554941?mt=8, accessed Jun. 26, 2013.

Soundhound Inc., "About Us", URL: www.soundhound.com/index.php?action=s.about, accessed Jun. 26, 2013.

Stingray Digital Media Group, "The Karaoke Channel—The Ultimate Karaoke Experience", URL: www.thekaraokechannel.com, accessed Jun. 21, 2013.

Stingray Digital Media Grou, "The Karaoke Channel—Karaoke for Mobile", URL: www.thekaraokechannel.com/mobile, accessed Jun. 26, 2013.

Stingray Digital Media Group, "The Karaoke Channel App for Smart TVs", URL: www.thekaraokechannel.com/on-tv/smart-tv-app.html, accessed Jun. 26, 2013.

Stingray Digital Media Group, "The Karaoke Channel Video on Demand", URL:www.thekaraokechannel.com/on-tv-video-on-demand.html, accessed Jun. 26, 2013.

TuneWiki, Inc., "TuneWiki—Lyrics for Music—Android Apps on Google Play", URL: play.google.com/store/apps/details?id=com.tunewiki.lyricplayer.android?hl=en, accessed Jun. 25, 2013.

Maxdroid, "Android Karaoke—Sing-Along", URL: play.google.com/store/apps/details?id=com.sadi, accessed Jun. 17, 2013.

Maxdroid, "Android Karaoke—Sing Along", URL: www.appbrain.com/app/android-karaoke-sing-along/com.sadi, accessed Jun. 17, 2013.

Park, Mansoo, et al., "Frequency-Temporal Filtering for a Robust Audio Fingerprinting Scheme in Real-Noise Environments", ETRI Journal, vol. 28, No. 4, Aug. 2006.

Andrassy, Bernt, et al., "Recognition Performance of the Siemens Front-end with and without Frame Dropping on the Aurora 2 Database", EUROSPEECH '01 Proceedings, Aalborg, Denmark, pp. 193-196, 2001.

A. Hyvarinen, et al., "Independent Component Analysis", New York, J. Wiley & Sons, Inc., 2001.

SIGNATURE MATCHING OF CORRUPTED AUDIO SIGNAL

CROSS-REFERENCE TO RELATED APPLICATIONS

None

BACKGROUND

The subject matter of this application broadly relates to systems and methods that facilitate remote identification of audio or audiovisual content being viewed by a user.

In many instances, it is useful to precisely identify audio or audiovisual content presented to a person, such as broadcasts on live television or radio, content being played on a DVD or CD, time-shifted content recorded on a DVR, etc. As one example, when compiling television or other broadcast ratings, or determining which commercials are shown during particular time slots, it is beneficial to capture the content played on the equipment of an individual viewer, particularly when local broadcast affiliates either display geographically-varying content, or insert local commercial content within a national broadcast. As another example, content providers may wish to provide supplemental material synchronized with broadcast content, so that when a viewer watches a particular show, the supplemental material may be provided to a secondary display device of that viewer, such as a laptop computer, tablet, etc. In this manner, if a viewer is determined to be watching a live baseball broadcast, each batter's statistics may be streamed to a user's laptop as the player is batting.

Contemporaneously determining what content a user is watching at a particular instant is not a trivial task. Some techniques rely on special hardware in a set-top box that analyzes video as the set-top box decodes frames. The requisite processing capability for such systems, however, is often cost-prohibitive. In addition, correct identification of decoded frames typically presumes an aspect ratio for a display, e.g. 4:3, when a user may be viewing content at another aspect ratio such as 16:9, thereby precluding a correct identification of the program content being viewed. Similarly, such systems are too sensitive to a program frame rate that may also be altered by the viewer's system, also inhibiting correct identification of viewed content.

Still other identification techniques add ancillary codes in audiovisual content for later identification. There are many ways to add an ancillary code to a signal so that it is not noticed. For example, a code can be hidden in non-viewable portions of television video by inserting it into either the video's vertical blanking interval or horizontal retrace interval. Other known video encoding systems bury the ancillary code in a portion of a signal's transmission bandwidth that otherwise carries little signal energy. Still other methods and systems add ancillary codes to the audio portion of content, e.g. a movie soundtrack. Such arrangements have the advantage of being applicable not only to television, but also to radio and pre-recorded music. Moreover, ancillary codes that are added to audio signals may be reproduced in the output of a speaker, and therefore offer the possibility of non-intrusively intercepting and distinguishing the codes using a microphone proximate the viewer.

While the use of embedded codes in audiovisual content can effectively identify content being presented to a user, such codes have disadvantages in practical use. For example, the code would need to be embedded at the source encoder, the code might not be completely imperceptible to a user, or might not be robust to sensor distortions in consumer-grade cameras and microphones.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
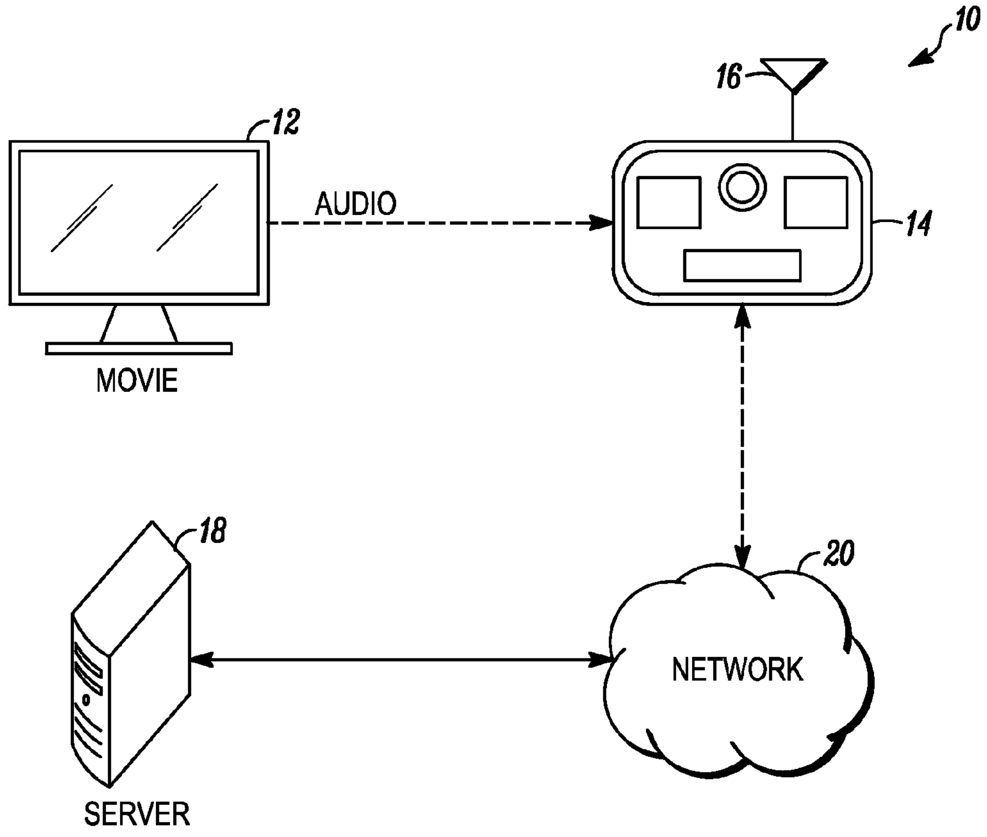
FIG. 1 shows a system that synchronizes audio or audio-visual content presented to a user on a first device, with supplementary content provided to the user through a second device, with the assistance of a server accessible through a network connection.

FIG. 1 shows the architecture of a system 10 capable of accurately identifying content that a user views on a first device 12, so that supplementary material may be provided to a second device 14 proximate to the user. The audio from the media content outputted by the first device 12 may be referred to as either the "primary audio" or simply the audio received from the device 12. The first device 12 may be a television or may be any other device capable of presenting audiovisual content to a user, such as a computer display, a tablet, a PDA, a cell phone, etc. Alternatively, the first device 12 may be a device capable of presenting audio content, along with any other information, to a user, such as an MP3 player, or it may be a device capable of presenting only audio content to a user, such as a radio or an audio system. The second device 14, though depicted as a tablet device, may be a personal computer, a laptop, a PDA, a cell phone, or any other similar device operatively connected to a computer processor as well as the microphone 16, and, optionally, to one or more additional microphones (not shown).

The second device 14 is preferably operatively connected to a microphone 16 or other device capable of receiving an audio signal. The microphone 16 receives the primary audio signal associated with a segment of the content presented on the first device 12. The second device 14 then generates an audio signature of the received signal using either an internal processor or any other processor accessible to it. If one or more additional microphones are used, then the second device preferably processes and combines the received signal from the multiple microphones before generating the audio signature of the received signal. Once an audio signature is generated that corresponds to content contemporaneously displayed on the first device 12, that audio signature is sent to a server 18 through a network 20 such as the Internet, or other network such as a LAN or WAN. The server 18 will usually be at a location remote from the first device 12 and the second device 14.

It should be understood that an audio signature, which may sometimes be called an audio fingerprint, may be represented using any number of techniques. To recite merely a few such examples, a pattern in a spectrogram of the captured audio signal may form an audio signature; a sequence of time and frequency pairs corresponding to peaks in a spectrogram may form an audio signature; sequences of time differences between peaks in frequency bands of a spectrogram may form an audio signature; and a binary matrix in which each entry corresponds to high or low energy in quantized time periods and quantized frequency bands may form an audio signature. Often, an audio signature is encoded into a string to facilitate a database search by a server.

The server 18 preferably stores a plurality of audio signatures in a database, where each audio signature is associated with content that may be displayed on the first device 12. The stored audio signatures may each be associated with a preselected interval within a particular item of audio or audiovisual content, such that a program is represented in the database by multiple, temporally sequential audio signatures. Alternatively, stored audio signatures may each continuously span the entirety of a program such that an audio signature for any defined interval of that program may be generated. Upon receipt of an audio signature from the second device 14, the server 18 attempts to match the received signature to one in its database. If a successful match is found, the server 18 may send to the second device 14 supplementary content associated with the matching programming segment. For example, if a person is watching a James Bond movie on the first device 12, at a moment displaying an image of a BMW or other automobile, the server 18 can use the received audio signature to identify the segment viewed, and send to the second device 14 supplementary information about that automobile such as make, model, pricing information, etc. In this manner, the supplementary material provided to the second device 14 is preferably not only synchronized to the program or other content is presented by the device 12 as a whole, but is synchronized to particular portions of content such that transmitted supplementary content may relate to what is contemporaneously displayed on the first device 12.

In operation, the foregoing procedure may preferably be initiated by the second device 14, either by manual selection, or automatic activation. In the latter instance, for example, many existing tablet devices, PDA's, laptops etc, can be used to remotely operate a television, or a set top box, or access a program guide for viewed programming etc. Thus, such a device may be configured to begin an audio signature generation and matching procedure whenever such functions are performed on the device. Once a signature generation and matching procedure is initiated, the microphone 16 is periodically activated to capture audio from the first device 12, and a spectrogram is approximated from the captured audio over each interval for which the microphone is activated. For example, let S[f,b] represent the energy at a band "b" during a frame "f" of a signal s(t) having a duration T, e.g. T=120 frames, 5 seconds, etc. The set of S[f,b] as all the bands are varied (b=1, . . . , B) and all the frames (f=1, . . . , F) are varied within the signal s(t), forms an F-by-B matrix S, which resembles the spectrogram of the signal. Although the set of all S[f,b] is not necessarily the equivalent of a spectrogram because the bands "b" are not Fast Fourier Transform (FFT) bins, but rather are a linear combination of the energy in each FFT bin, for purposes of this disclosure, it will be assumed either that such a procedure does generate the equivalent of a spectrogram, or some alternate procedure to generate a spectrogram from an audio signal is used, which are well known in the art.

Using the generated spectrogram from a captured segment of audio, the second device 14 generates an audio signature of that segment. The second device 14 preferably applies a threshold operation to the respective energies recorded in the spectrogram S[f,b] to generate the audio signature, so as to identify the position of peaks in audio energy within the spectrogram 22. Any appropriate threshold may be used. For example, assuming that the foregoing matrix S[f,b] represents the spectrogram of the captured audio signal, the second device 14 may preferably generate a signature S*, which is a binary F-by-B matrix in which S*[f,b]=1 if S[f,b] is among the P % (e.g. P %=10%) peaks with highest energy among all entries of S. Other possible techniques to generate an audio signature could include a threshold selected as a percentage of the maximum energy recorded in the spectrogram. Alternatively, a threshold may be selected that retains a specified percentage of the signal energy recorded in the spectrogram.

Figure 2:
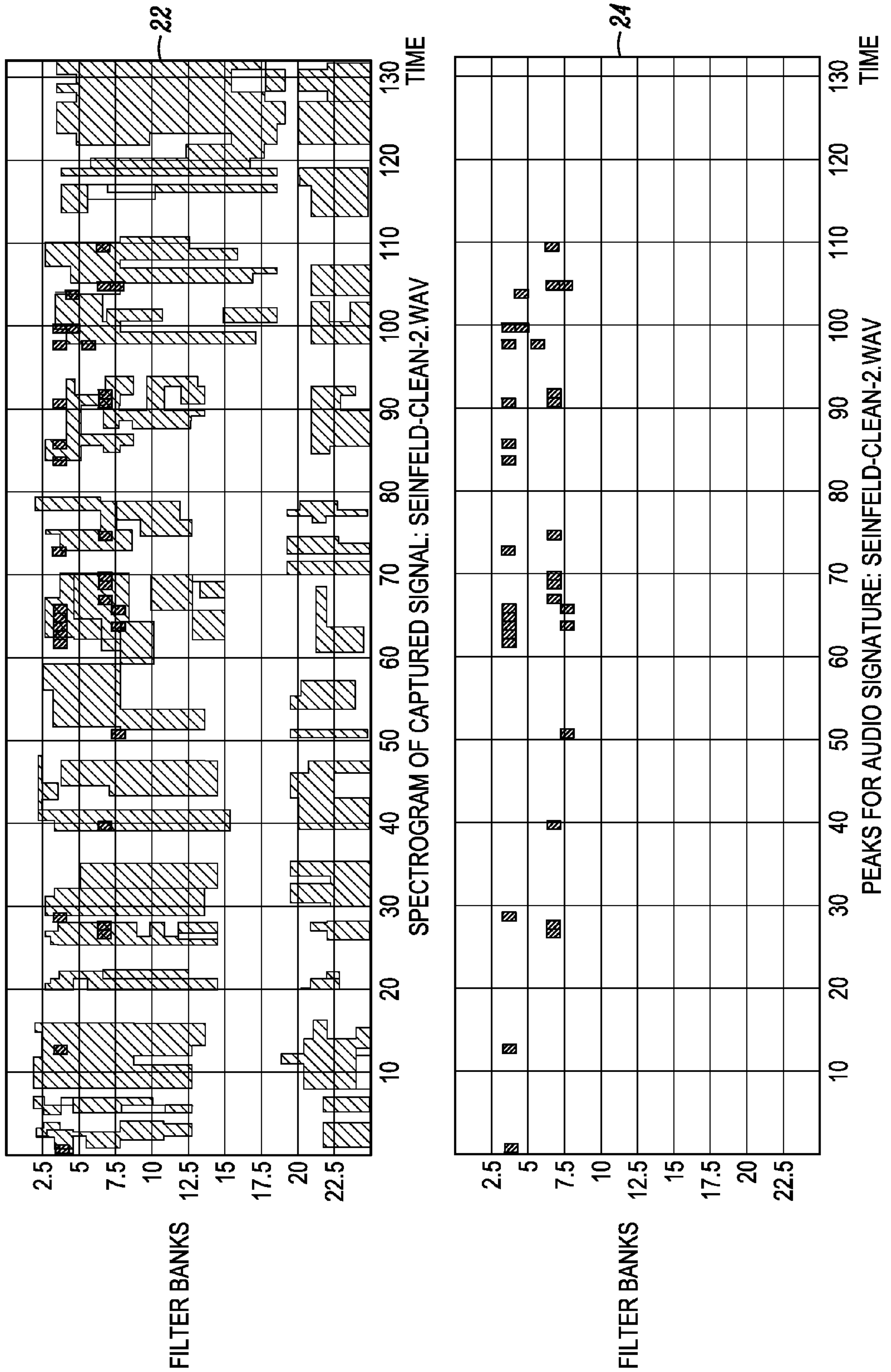
FIG. 2 shows a spectrogram of an audio segment captured by the second device of FIG. 1, along with an audio signature generated from that spectrogram.

FIG. 2 illustrates a spectrogram 22 of an audio signal that was captured by the microphone 16 of the second device 14 depicted in FIG. 1, along with an audio signature 24 generated from the captured spectrogram 22. The spectrogram 22 records the energy in the measured audio signal, within the defined frequency bands (kHz) shown on the vertical axis, at the time intervals shown on the horizontal axis. The time axis of FIG. 2 denotes frames, though any other appropriate metric may be used, e.g. milliseconds, etc. It should also be understood that the frequency ranges depicted on the vertical axis and associated with respective filter banks may be changed to other intervals, as desired, or extended beyond 25 kHz. In this illustration, the audio signature 24 is a binary matrix that indicates the frame-frequency band pairs having relatively high power. Once generated, the audio signature 24 characterizes the program segment that was shown on the first device 12 and recorded by the second device 14, so that it may be matched to a corresponding segment of a program in a database accessible to the server 18.

Specifically, server 18 may be operatively connected to a database from which individual ones of a plurality of audio signatures may be extracted. The database may store a plurality of M audio signals s(t), where $s_m(t)$ represents the audio signal of the $m^{th}$ asset. For each asset "m," a sequence of audio signatures $\{S_m^*[f_n, b]\}$ may be extracted, in which $S_m^*[f_n, b]$ is a matrix extracted from the signal $s_m(t)$ in between frame n and n+F. Assuming that most audio signals in the database have roughly the same duration and that each $s_m(t)$ contains a number of frames $N_{max}$>>F, after processing all M assets, the database would have approximately $MN_{max}$ signatures, which would be expected to be a very large number (on the order of $10^7$ or more). However, with modern processing power, even this number of extractable audio signatures in the database may be quickly searched to find a match to an audio signature 24 received from the second device 14.

It should be understood that the audio signatures for the database may be generated ahead of time for pre-recorded programs or in real-time for live broadcast television programs. It should also be understood that, rather than storing audio signals s(t), the database may store individual audio signatures, each associated with a segment of programming available to a user of the first device 12 and the second device 14. In another embodiment, the server 18 may store individual audio signatures, each corresponding to an entire program, such that individual segments may be generated upon query by the server 18. Still another embodiment would store audio spectrograms from which audio signatures would be generated. Also, it should be understood that some embodiments may store a database of audio signatures locally on the second device 12, or in storage available to in through e.g. a home network or local area network (LAN), obviating the need for a remote server. In such an embodiment, the second device 12 or some other processing device may perform the functions of the server described in this disclosure.

Figure 3:
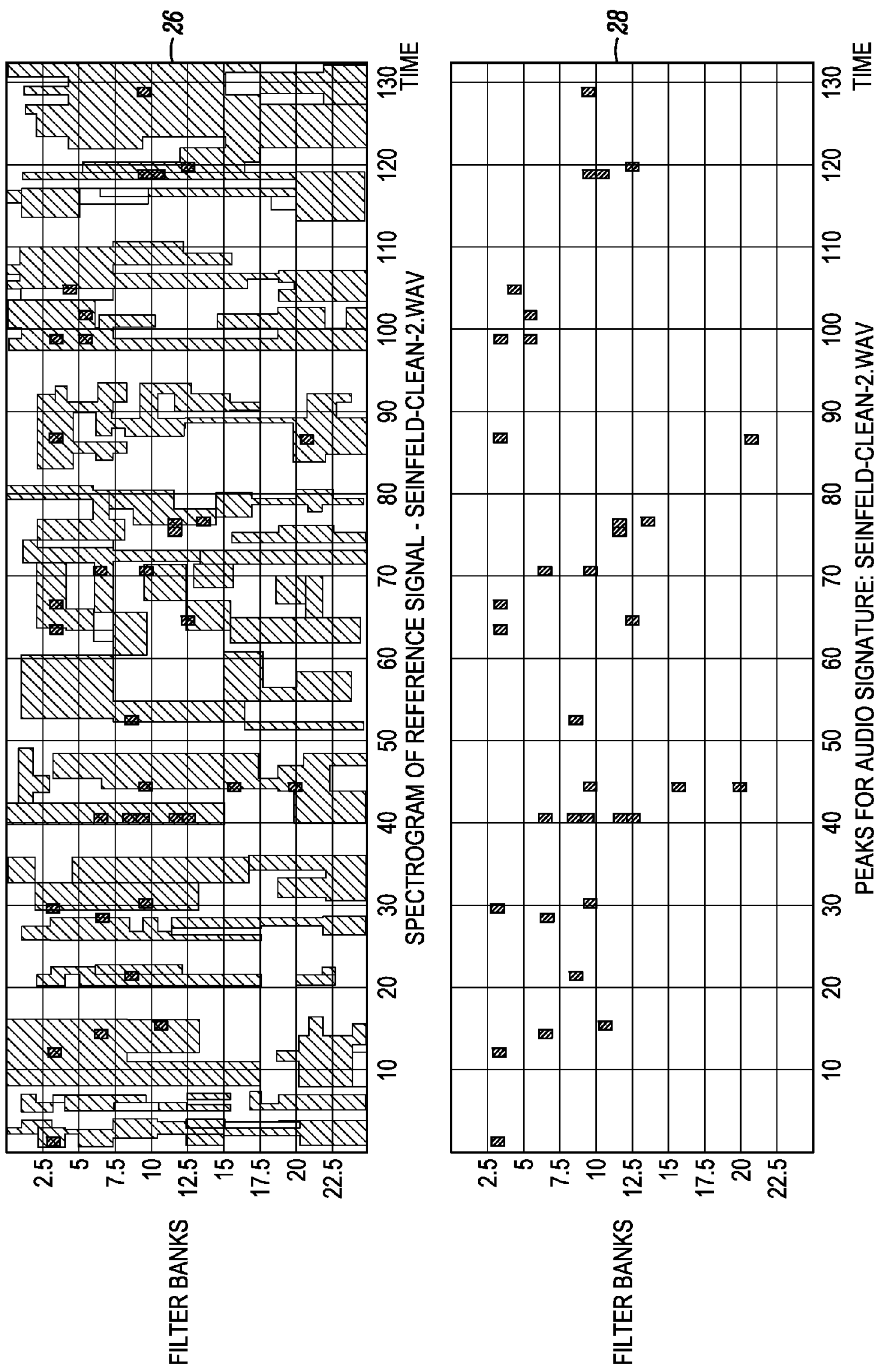
FIG. 3 shows a reference spectrogram of the audio segment of FIG. 2, along with an audio signature generated from the reference spectrogram, and stored in a database accessible to the server shown in FIG. 1.

FIG. 3 shows a spectrogram 26 that was generated from a reference audio signal s(t) by the server 18. This spectrogram corresponds to the audio segment represented by the spectrogram 22 and audio signature 24, which were generated by second device 14. As can be seen by comparing the spectrogram 26 to the spectrogram 22, the energy characteristics closely correspond, but are weaker with respect to spectrogram 22, owing to the fact that spectrogram 22 was generated from an audio signal recorded by a microphone located at a distance away from a television playing audio associated with the reference signal. FIG. 3 also shows a reference audio signature 28 generated by the server 18 from the reference signal s(t). The server 18 may correctly match the audio signature 24 to the audio signature 28 using any appropriate procedure. For example, expressing the audio signature obtained by the second device 14, used to query the database, as $S_q$*, a basic matching operation in the server could use the following pseudo-code:

```
for m=1,...,M
    for n=1,...,N_max-F
        score[n,m] = < S_m*[n] , S_q* >
    end
end
```

where, for any two binary matrixes A and B of the same dimensions, <A,B> are defined as being the sum of all elements of the matrix in which each element of A is multiplied by the corresponding element of B and divided by the number of elements summed. In this case, score[n,m] is equal to the number of entries that are 1 in both $S_m$*[n] and $S_q$*. After collecting score[n,m] for all possible "m" and "n", the matching algorithm determines that the audio collected by the second device 14 corresponds to the database signal $s_m$(t) at the delay f corresponding to the highest score[n,m].

Figure 4:
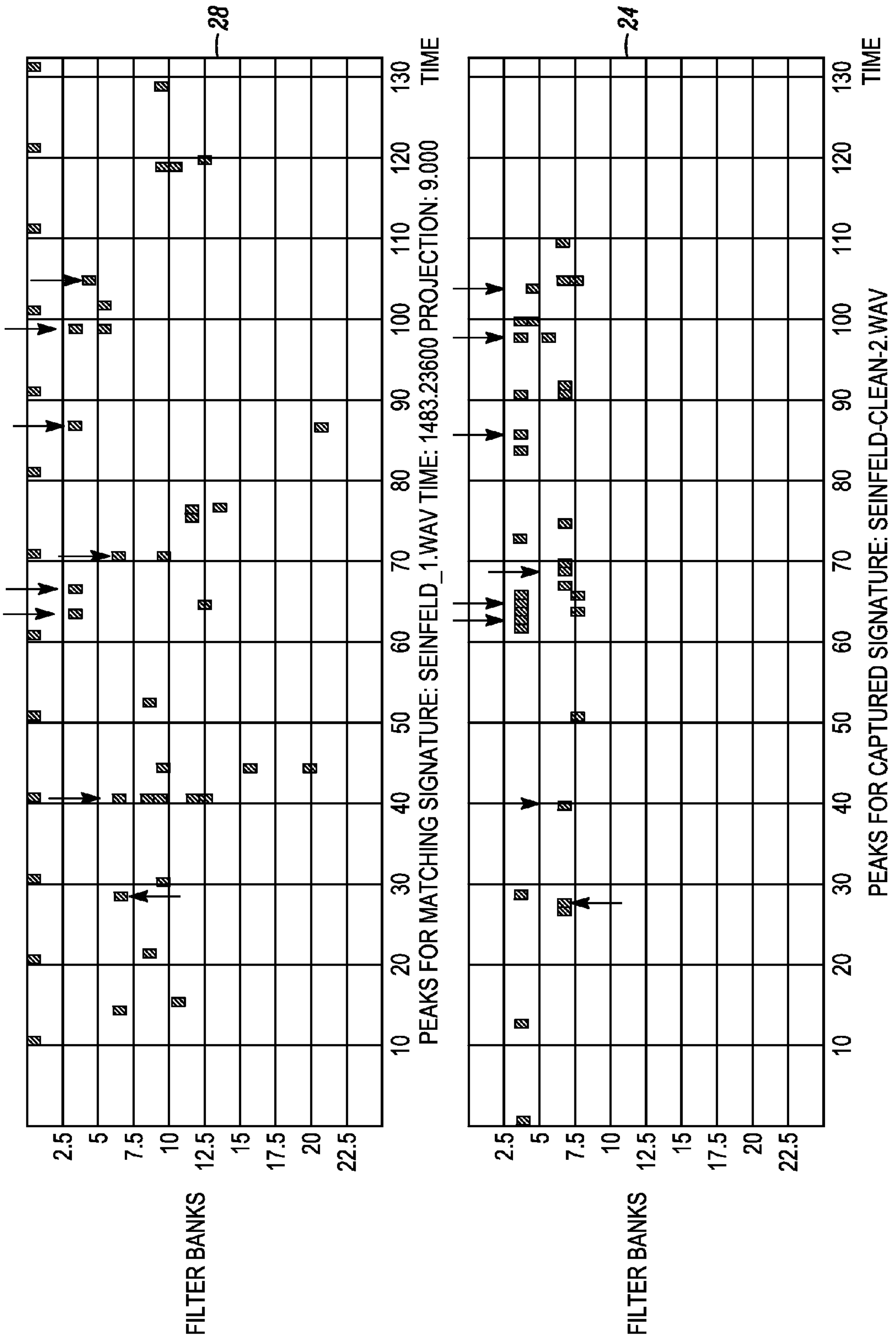
FIG. 4 shows a comparison between the audio signature of FIG. 3 and a matching audio signature in the database of the server of FIG. 1.

Referring to FIG. 4, for example, the audio signature 24 generated from audio captured by the second device 14 was matched by the server 18 to the reference audio signature 28. Specifically, the arrows depicted in this figure show matching peaks in audio energy between the two audio signatures. These matching peaks in energy were sufficient to correctly identify the reference audio signature 28 with a matching score of score[n,m]=9. A match may be declared using any one of a number of procedures. As noted above, the audio signature 24 may be compared to every audio signature in the database at the server 18, and the stored signature with the most matches, or otherwise the highest score using any appropriate algorithm, may be deemed the matching signature. In this basic matching operation, the server 18 searches for the reference "m" and delay "n" that produces the highest score [n,m] by passing through all possible values of "m" and "n."

In an alternative procedure, the database may be searched in a pre-defined sequence and a match is declared when a matching score exceeds a fixed threshold. To facilitate such a technique, a hashing operation may be used in order to reduce the search time. There are many possible hashing mechanisms suitable for the audio signature method. For example, a simple hashing mechanism begins by partitioning the set of integers 1, . . . , F (where F is the number of frames in the audio capture and represents one of the dimensions of the signature matrix) into $G_F$ groups, e.g., if F=100, $G_F$=5, the partition would be {1, . . . , 20}, {21, . . . , 40}, . . . , {81, . . . , 100}) Also, the set of integers 1, . . . , B is also partitioned into $G_B$ groups, where B is the number of bands in the spectrogram and represents another dimension of the signature matrix. A hashing function H is defined as follows: for any F-by-B binary matrix S*, HS*=S', where S' is a $G_F$-by-$G_B$ binary matrix in which each entry ($G_F$,$G_B$) equals 1 if one or more entries equal 1 in the corresponding two-dimensional partition of S*.

Referring to FIG. 4 to further illustrate this procedure, the query signature 28 received from the device 14 shows that F=130, B=25, while $G_F$=13 and $G_B$=10, assuming that the grid lines represent the frequency partitions specified. The entry (1,1) of matrix S' used in the hashing operation equals 0 because there are no energy peaks in the top left partition of the reference signature 28. However, the entry (2,1) of S' equals 1 because the partition (2.5,5)×(0,10) has one nonzero entry. It should be understood that, though $G_F$=13 and $G_B$=10 were used in this example above, it may be more convenient to use $G_F$=5 and $G_B$=4. Alternatively, any other values may be used, but they should be such that $2\hat{}\{G_F G_B\}$<<$MN_{max}$.

When applying the hashing function H to all $MN_{max}$ signatures in the database, the database is partitioned into $2\hat{}\{G_F G_B\}$ bins, which can each be represented by a matrix $A_j$ of 0's and 1's, where j=1, . . . , $2\hat{}\{G_F G_B\}$. A table T indexed by the bin number is created and, for each of the $2\hat{}\{G_F G_B\}$ bins, the table entry T[j] stores the list of the signatures $S_m$*[n] that satisfies $HS_m$*[n]=$A_j$. The table entries T[j] for the various values of j are generated ahead of time for pre-recorded programs or in real-time for live broadcast television programs. The matching operation starts by selecting the bin entry given by $HS_q$*. Then the score is computed between $S_q$* against all the signatures listed in the entry T[$HS_q$*]. If a high enough score is found, the process is concluded. Alternatively, if a high enough score is not found, the process selects ones of the bins whose matrix $A_j$ is closest to $HS_q$* in the Hamming distance (the Hamming distance counts the number of different bits between two binary objects) and scores are computed between $S_q$* against all the signatures listed in the entry T[j]. If a high enough score is not found, the process selects the next bin whose matrix $A_j$ is closest to $HS_q$* in the Hamming distance. The same procedure is repeated until a high enough score is found or until a maximum number of searches is reached. The process concludes with either no match declared or a match is declared to the reference signature with the highest score. In the above procedure, since the hashing operation for all the stored content in the database is performed ahead of time (only live content is hashed in real time), and since the matching is first attempted against the signatures listed in the bins that are most likely to contain the correct signature, the number of searches and the processing time of the matching process is significantly reduced.

Intuitively speaking, the hashing operation performs a "two-level hierarchical matching." The matrix $HS_q$* is used to prioritize which bins of the table T in which to attempt matches, and priority is given to bins whose associated matrix $A_j$ are closer to $HS_q$* in the Hamming distance. Then, the actual query $S_q$* is matched against each of the signatures listed in the prioritized bins until a high enough match is found. It may be necessary to search over multiple bins to find a match. In FIG. 4, for example, the matrix $A_j$ corresponding to the bin that contains the actual signature has 25 entries of "1" while $HS_q$* has 17 entries of "1," and it is possible to see that $HS_q$* contains is at different entries as the matrix $A_j$, and vice-versa. Furthermore, matching operations using hashing are only required during the initial content identification and during resynchronization. When the audio signatures are captured to merely confirm that the user is still watching the same asset, a basic matching operation can be used (since M=1 at this time).

The preceding techniques that match an audio signature captured by the second device 14 to corresponding signatures in a remote database work well, so long as the captured audio signal has not been corrupted by, for instance, high energy noise. As one example, given that the second device 14 will be proximate to one or more persons viewing the program on a television or other such first device 12, high energy noise from a user (e.g., speaking, singing, or clapping noises) may also be picked up by the microphone 16. Still other examples might be similar incidental sounds such as doors closing, sounds from passing trains, etc.

Figure 5:
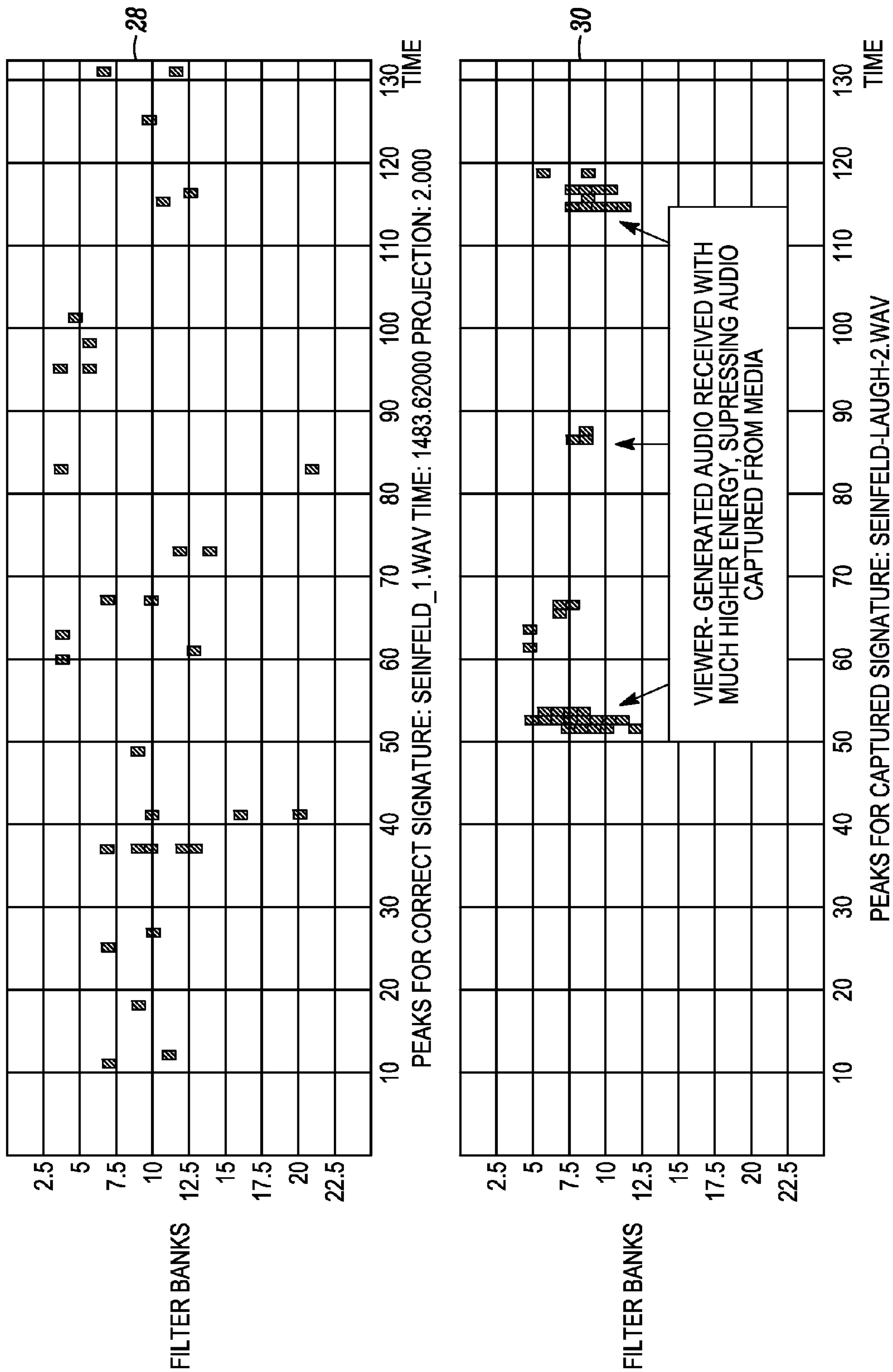
FIG. 5 shows a comparison between an audio signature corrupted by external noise with an uncorrupted audio signature.
Figure 6:
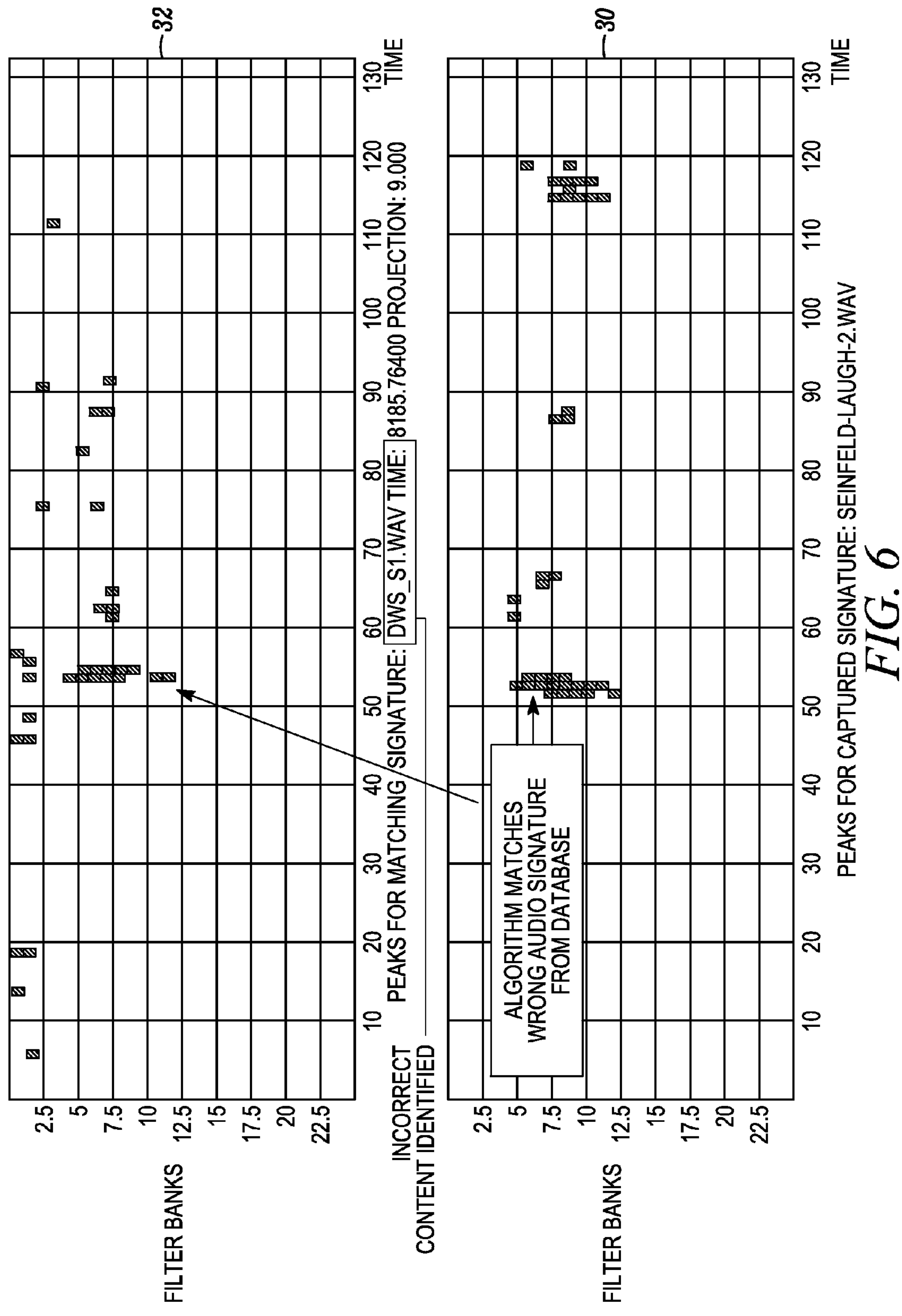
FIG. 6 illustrates that the corrupted signature of FIG. 5, when received by a server 18, may result in an incorrect match.

FIGS. 5-6 illustrate how such extraneous noise can corrupt an audio signature of captured audio, and adversely affect a match to a corresponding signature in a database. Specifically, FIG. 5 shows a reference audio signature 28 for a segment of a television program, along with an audio signature 30 of that same program segment, captured by a microphone 16 of device 14, but where the microphone 16 also captured noise from the user during the segment. As can be anticipated, the user-generated audio masks the audio signature of the segment recorded by the microphone 16, and as can be seen in FIG. 6, the user-generated audio can result in an incorrect signature 32 in the database being matched (or alternatively, no matching signature being found.)

Figure 7:
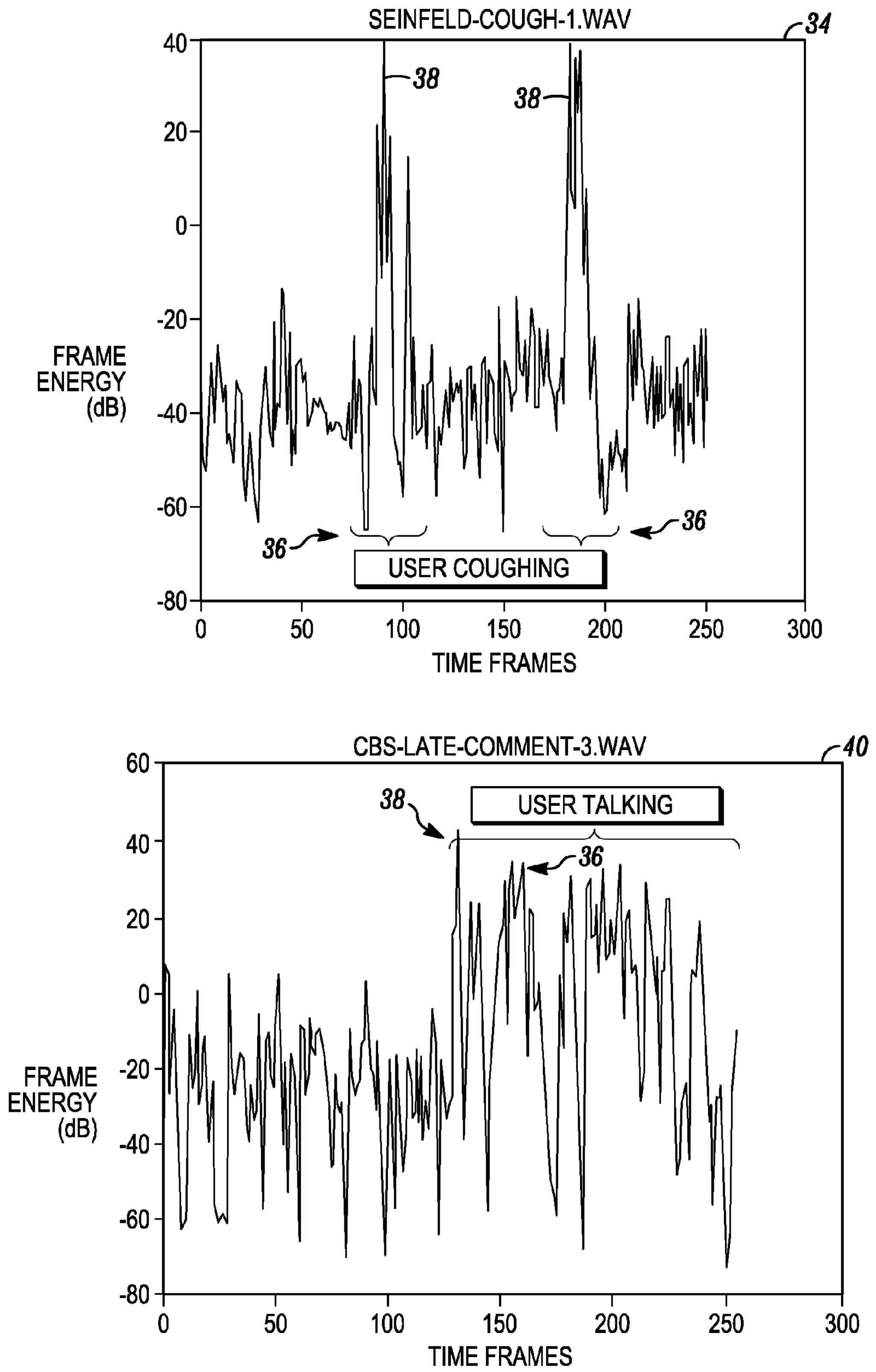
FIG. 7 shows waveforms of a user coughing or talking over audio captured by a client device from a display device, such as a television.
Figure 8:
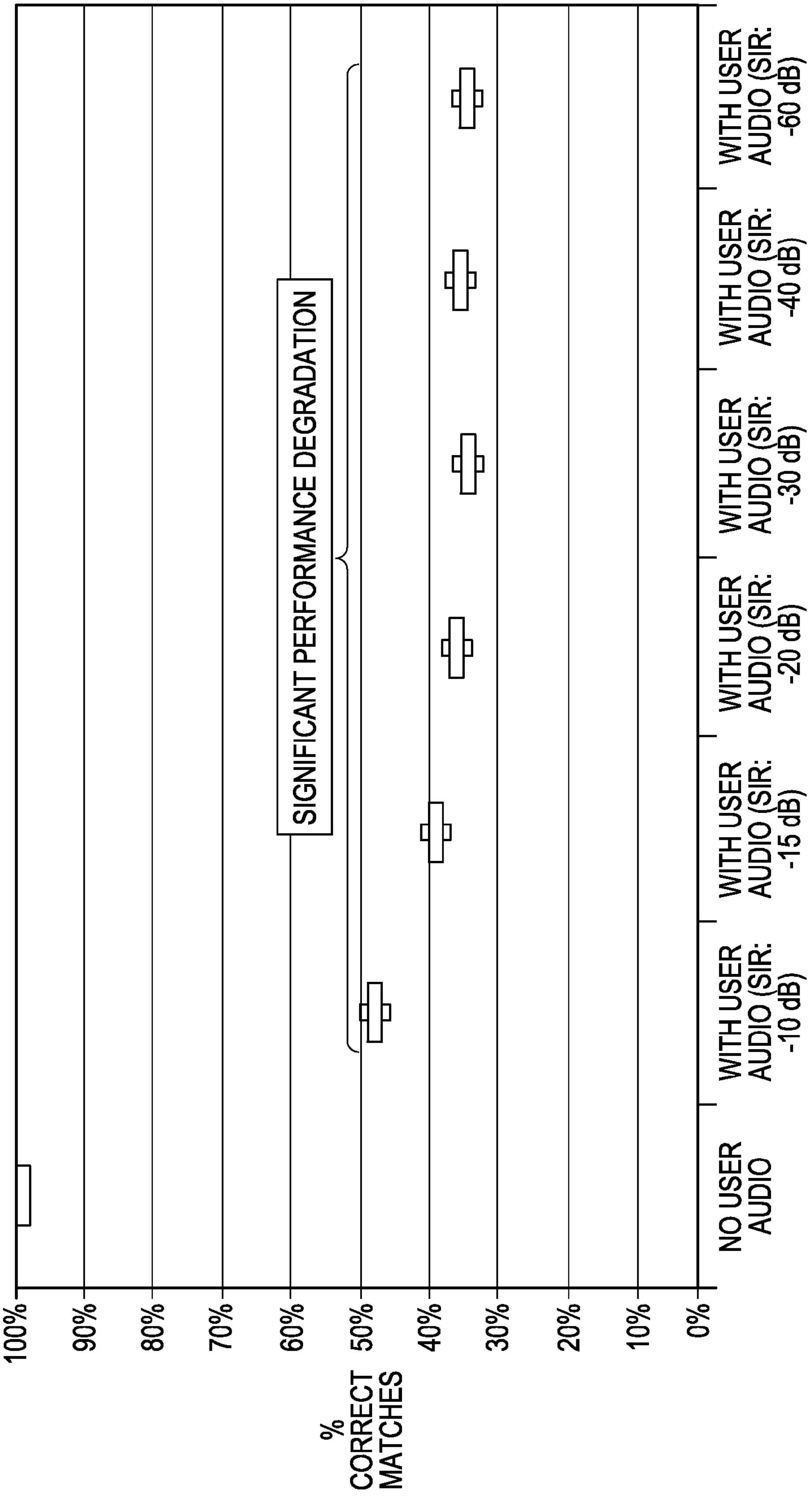
FIG. 8 shows various levels of performance degradation in correctly matching audio signatures relative to the energy level of extraneous audio.

FIG. 7 shows exemplary waveforms 34 and 40, each of an audio segment captured by a microphone 16 of a second device 14, where a user is respectively coughing and talking during intervals 36. The user-generated audio during these intervals 36 have peaks 38 that are typically about 40 dB above the audio of the segment for which a signature is desired. The impact of this typical difference in the audio energy between the user-generated audio and the audio signal from a television was evaluated in an audio signature extraction method in which signatures are formed by various sequences of time differences between peaks, each sequence from a particular frequency band of the spectrogram. Referring to FIG. 8, this typical difference of about 40 dB between user-generated audio and an audio signal from a television or other audio device resulted in a performance drop of approximately 65% when attempting to find a matching signature in a remote database. As can also be seen from this figure, even a difference of only 10 dB still degrades performance by over 50%.

Providing an accurate match between an audio signature generated at a location of a user with a corresponding reference audio signature in a remote database, in the presence of extraneous noise that corrupts the audio captured signature, is problematic. An audio signature derived from a spectrogram only preserves peaks in signal energy, and because the source of noise in the recorded audio frequently has more energy than the signal sought to be recorded, portions of an audio signal represented in a spectrogram and corrupted by noise certainly cannot easily be recovered, if ever. Possibly, an audio signal captured by a microphone 16 could be processed to try to filter any extraneous noise from the signal prior to generating a spectrogram, but automating such a solution would be difficult given the unpredictability of the presence of noise. Also, given the possibility of actual program segments being mistaken for noise (segments involving shouting, or explosions, etc.), any effective noise filter would likely depend on the ability to model noise accurately. This might be accomplished by, e.g. including multiple microphones in the second device 14 such that one microphone is configured to primarily capture noise (by being directed at the user, for example). Thus, the audio captured by the respective microphones could be used to model the noise and filter it out. However, such a solution might entail increased cost and complexity, and noise such as user generated audio still corrupts the audio signal intended to be recorded given the close proximity between the second device 14 and the user.

Figure 9:
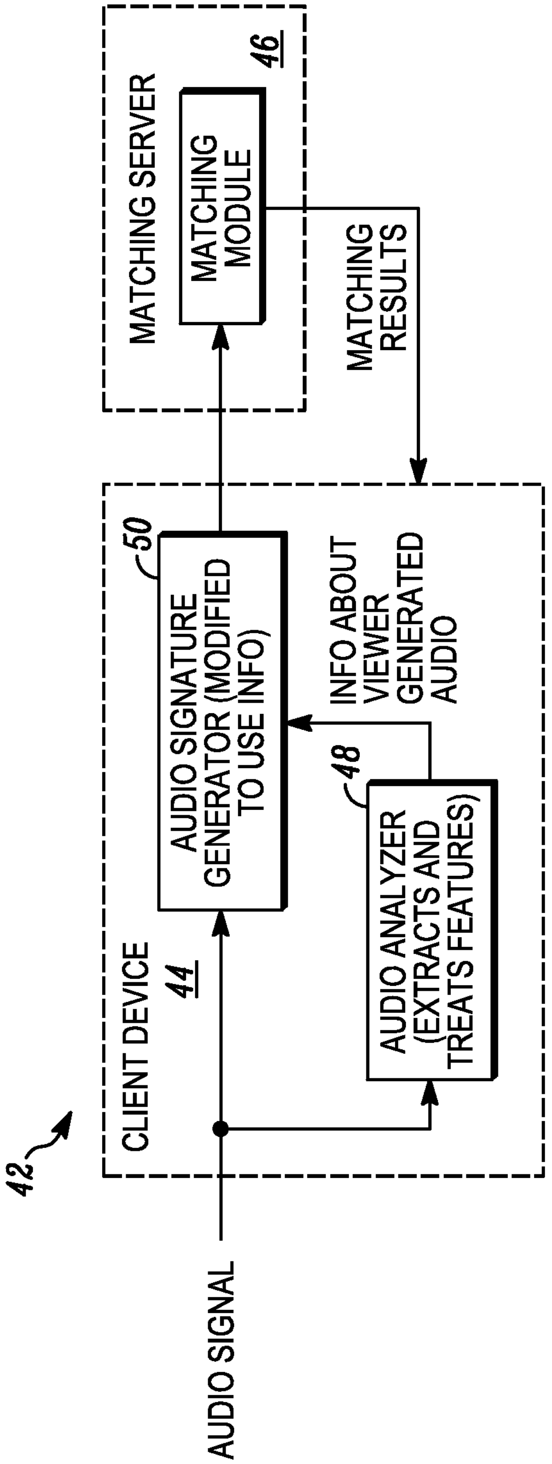
FIG. 9 shows a first system that corrects for a corrupted audio signature.

In view of such difficulties, FIG. 9 illustrates an example of a novel system that enables accurate matches between reference signatures in a database at a remote location (such as at the server 18) and audio signatures generated locally (by, for example, receiving audio output from a presentation device, such as the device 12), and even when the audio signatures are generated from corrupted spectrograms, e.g. spectrograms of audio including user-generated audio. It should be appreciated that the term "corruption" is merely meant to refer to any audio received by the microphone 16, for example, or any other information reflected in a spectrogram or audio signature, signal or noise, that originates from something other than the primary audio from the display device 12. It should also be appreciated that, although the descriptions that follow usually refer to user-generated audio, the embodiments of this invention apply to any other audio extraneous to the program being consumed, which means that any of the methods to deal with the corruption caused by user-generated audio can also be applied to deal with the corruption caused by noises like appliances, horns, doors being slammed, toys, etc. In general, extraneous audio refers to any audio other than the primary audio. Specifically, FIG. 9 shows a system 42 that includes a client device 44 and a server 46 that matches audio signatures sent by the client device 44 to those in a database operatively connected to the server 46. The client device 44 may be a tablet, a laptop, a PDA or other such second device 14, and preferably includes an audio signature generator 50. The audio signature generator 50 generates a spectrogram from audio received by one or more microphones 16 proximate the client device 44. The one or more microphones 16 are preferably integrated into the client device 44, but optionally the client device 44 may include an input, such as a microphone jack or a wireless transceiver capable of connection to one or more external microphones.

As noted previously, the spectrogram generated by the audio signature generator 50 may be corrupted by noise from a user, for example. To correct for this noise, the system 42 preferably also includes an audio analyzer 48 that has as an input the audio signal received by the one or more microphones 16. It should also be noted that, although the audio analyzer 48 is shown as simply receiving an audio signal from the microphone 16, the microphone 16 may be under control of the audio analyzer 48, which would issue commands to activate and deactivate the microphone 16, resulting in the audio signal that is subsequently treated by the Audio Analyzer 48 and Audio Signature Generator 50. The audio analyzer 48 processes the audio signal to identify both the presence and temporal location of any noise, e.g. user generated audio. As noted previously with respect to FIG. 7, noise in a signal may often have much higher energy than the signal itself, hence for example, the audio analyzer 48 may apply a threshold operation on the signal energy to identify portions of the audio signature greater than some percentage of the average signal energy, and identify those portions as being corrupted by noise. Alternatively, the audio analyzer may identify any portions of received audio above some fixed threshold as being corrupted by noise, or still alternatively may use another mechanism to identify the presence and temporal position in the audio signal of noise by, e.g. using a noise model or audio from a dedicated second microphone 16, etc. An alternative mechanism that the Audio Analyzer 48 can use to determine the presence and temporal position of user generated audio may be observing unexpected changes in the spectrum characteristics of the collected audio. If, for instance, previous history indicates that audio captured by a television has certain spectral characteristics, then a change in such characteristics could indicate the presence of user generated audio. Another alternative mechanism that the Audio Analyzer 48 can use to determine the presence and temporal position of user generated audio may be using speaker detection techniques. For instance, the Audio Analyzer 48 may build speaker models for one or more users of a household and, when analyzing the captured model, may determine through these speaker models that the collected audio contains speech from the modelled speakers, indicating that they are speaking during the audio collection process and, therefore, are generating user-generated corruption in the audio received from the television.

Figure 10:
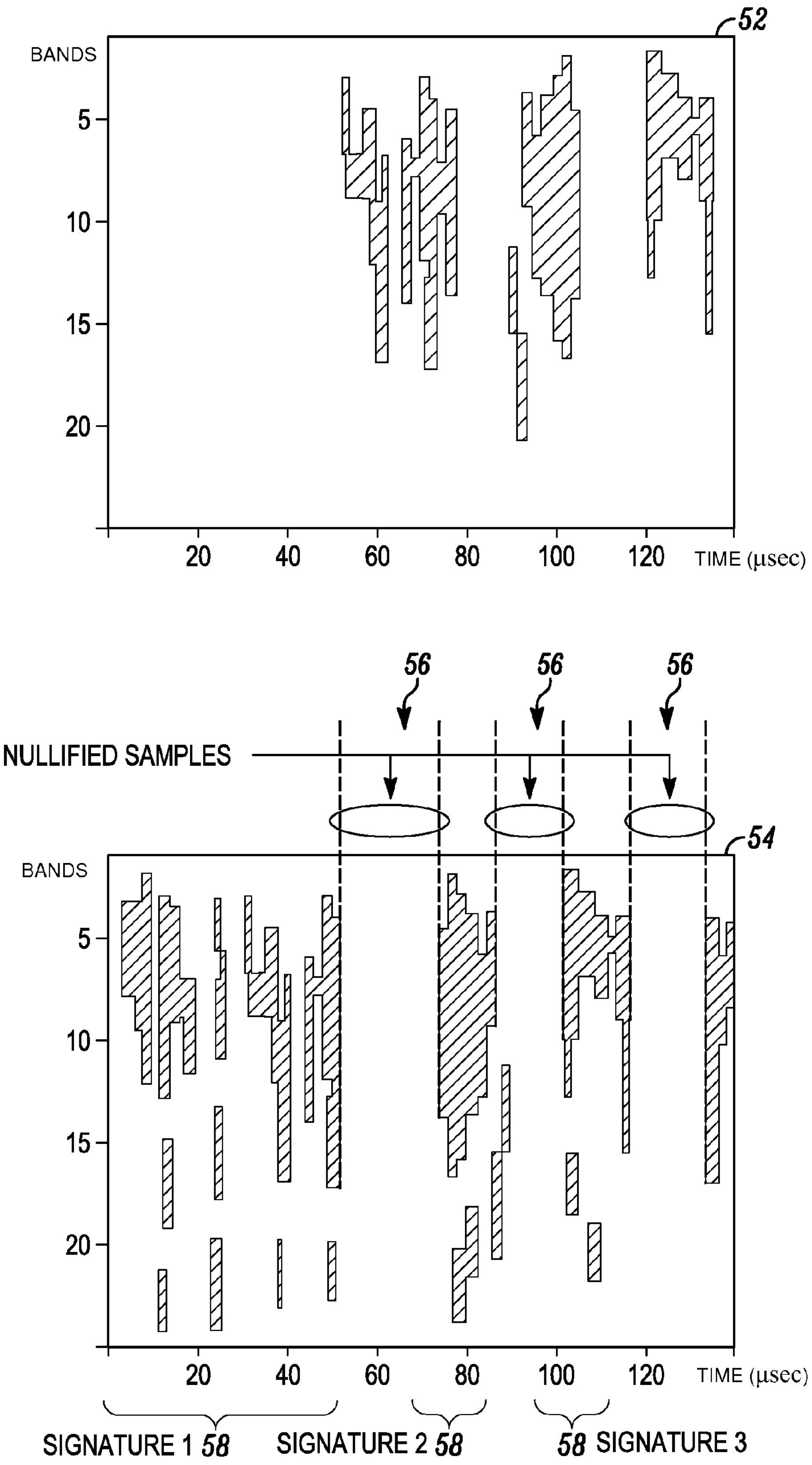
FIG. 10 shows a comparison between a corrupted audio signature and one that has been corrected by the system of FIG. 9.

Once the audio analyzer 48 has identified the temporal location of any detected noise in the audio signal received by the one or more microphones 16, the audio analyzer 48 provides that information to the audio signature generator 50, which may use that information to nullify those portions of the spectrogram it generates that are corrupted by noise. This process can be generally described with reference to FIG. 10, which shows a first spectrogram 52 that includes user generated audio dazzling portions of the signal, making them too weak to be noticed. As indicated previously, were an audio signature simply generated from the spectrogram 52, that audio signature would not likely be correctly matched by the server 46 shown in FIG. 10. The audio signature generator 50, however, uses the information from the audio analyzer 48 to nullify or exclude the segments 56 when generating an audio signature. One procedure for doing this is as follows. Let S[f,b] represent the energy in band "b" during a frame "f" of a signal s(t) having a duration T, e.g. T=120 frames, 5 seconds, etc. As all the bands are varied (b=1, . . . , B) and all the frames (f=1, . . . , F) are varied within the signal s(t), the set of S[f,b] forms an F-by-B matrix S, which resembles the spectrogram of the signal. Let F^ denote the subset of {1, . . . , F} that corresponds to frames located within regions that were identified by the Audio Analyzer 48 as containing user-generated audio or other such noise corrupting a signal, and let SA be a matrix defined as follows: if f is not in F^, then S^[f,b]=S[f,b] for all b; otherwise, S^[f,b]=0 for all b. From S^, the Audio Signature Generator 50 creates the signature $S_q$*, which is a binary F-by-B matrix in which $S_q$*[f,b]=1 if S^[f,b] is among the P % (e.g. P=10%) peaks with highest energy among all entries of S^. The single signature $S_q$* is then sent by the Audio Signature Generator 50 to the Matching Server 46. Alternatively, a procedure by which the audio signature generator excludes segments 56 is to generate multiple signatures 58 for the audio segment, each comprising contiguous audio segments that are uncorrupted by noise. The client device 44 may then transmit to the server 46 each of these signatures 58, which may be separately matched to reference audio signatures stored in a database, with the matching results returned to the client device 44. The client device 44 then may use the matching results to make a determination as to whether a match was found. For example, the server 46 may return one or more matching results that indicate both an identification of the program to which a signature was matched, if any, along with a temporal offset within that program indicating where in the program the match was found. The client device may then, in this instance, declare a match when some defined percentage of signatures is matched both to the same program and within sufficiently close temporal intervals to one another. In determining the sufficiency of the temporal intervals by which matching segments should be spaced apart, the client device 44 may optionally use information about the temporal length of the nullified segments, i.e. whether different matches to the same program are temporally separated by approximately the same time as the duration of the segments nullified from the audio signatures sent to the server 46. It should be understood that an alternate embodiment could have the server 46 perform this analysis and simply return a single matching program to the set of signatures sent by the client device 44, if one is found.

Figure 11:
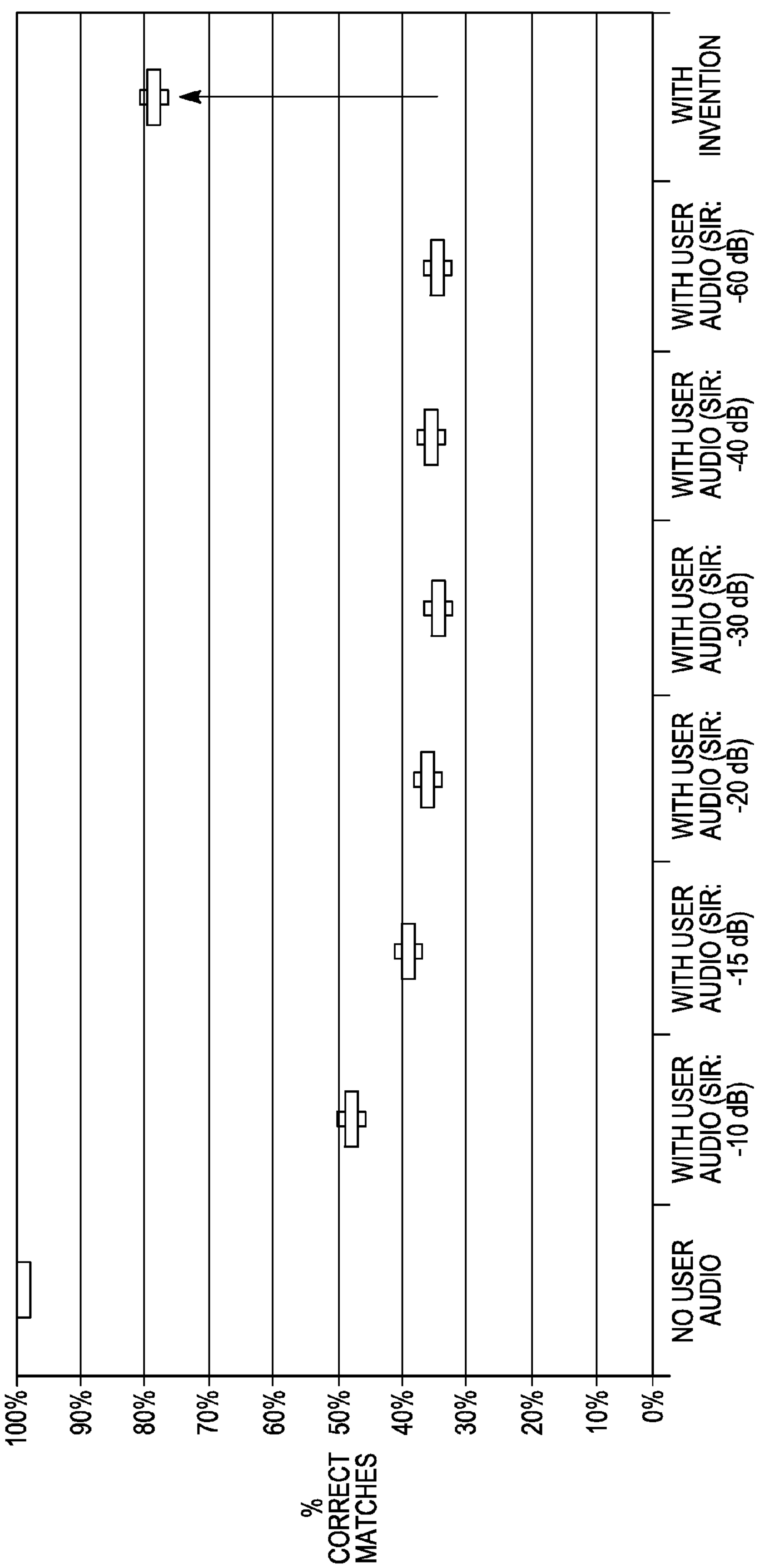
FIG. 11 illustrates the performance of the system of FIG. 9.

The above procedure can be used not only in audio signature extraction methods in which signatures are formed by binary matrixes, but also in methods in which signatures are formed by various sequences of time differences between peaks, each sequence from a particular frequency band of the spectrogram. FIG. 11 generally shows the improvement in performance gained by using the system 42 in the latter case. As can be seen, where the system 42 is not used, performance drops to anywhere between about 49% to about 33% depending on the ratio of signal to noise. When the system 42 is used, however, performance in the presence of noise, such as user-generated audio, increases to approximately 79%.

Figure 12:
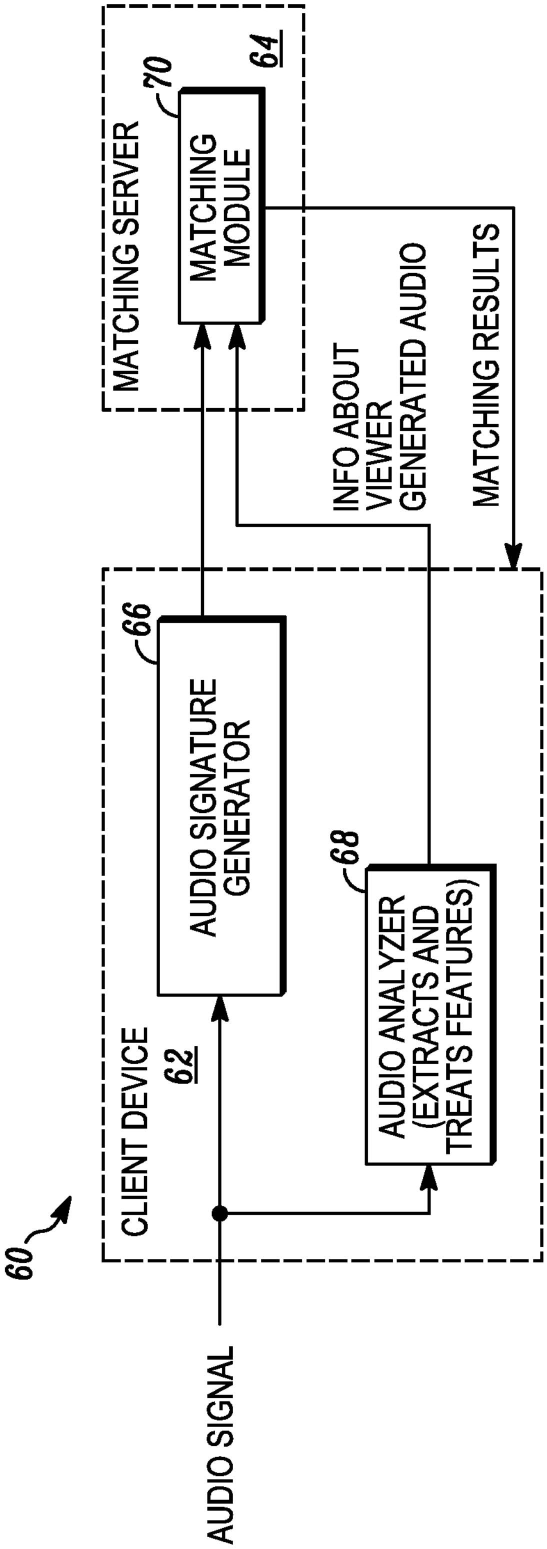
FIG. 12 shows a second first system that corrects for a corrupted audio signature.

FIG. 12 shows an alternate system 60 having a client device 62 and a matching server 64. The client device 62 may again be a tablet, a laptop, a PDA, or any other device capable of receiving an audio signal and processing it. The client device 62 preferably includes an audio signature generator 66 and an audio analyzer 68. The audio signature generator 66 generates a spectrogram from audio received by one or more microphones 16 integrated with or proximate the client device 62 and provides the audio signature to the matching server 64. As mentioned before, the microphone 16 may be under control of the audio analyzer 68, which issues commands to activate and deactivate the microphone 16, resulting in the audio signal that is subsequently treated by the Audio Analyzer 68 and Audio Signature Generator 66. The audio analyzer 68 processes the audio signal to identify both the presence and temporal location of any noise, e.g. user generated audio. The audio analyzer 68 provides information to the server 64 indicating the presence and temporal location of any noise found by its analysis.

The server 64 includes a matching module 70 that uses the results provided by the audio analyzer 68 to match the audio signature provided by the audio signature generator 66. As one example, let S[f,b] represent the energy in band "b"

during a frame "f" of a signal s(t) and let F^ denote the subset of {1, . . . , F} that corresponds to frames located within regions that were identified by the Audio Analyzer 68 as containing user-generated audio or other such noise corrupting a signal, as explained before; the matching module 70 may disregard portions of the received audio signature determined to contain noise, i.e. perform a matching analysis between the received signature and those in a database only for time intervals not corrupted by noise. More precisely, the query audio signature Sq* used in the matching score is replaced by Sq defined as follows: if f is not in F^, Sq[f,b]=Sq*[f,b] for all b; and if f is in F^, Sq**[f,b]=0 for all b; and the final matching score is given by <Sm*[n], Sq>, with the operation <.,.> as defined before. In such an example, the server may select the audio signature from the database with the highest matching score (i.e. the most matches) as the matching signature. Alternatively, the Matching Module 70** may adopt a temporarily different matching score function; i.e., instead of using the operation <Sm*[n], Sq*>, the Matching Module 70 uses an alternative matching operation <Sm*[n], Sq*>$_{F^\wedge}$, where the operation <A,B>$_{F^\wedge}$ A between two binary matrixes A and B is defined as being the sum of all elements in the columns not included in F^ of the matrix in which each element of A is multiplied by the corresponding element of B and divided by the number of elements summed. In this latter alternative, the matching module 70 in effect uses a temporally normalized score to compensate for any excluded intervals. In other words, the normalized score is calculated as the number of matches divided by the ratio of the signature's time intervals that are being considered (not excluded) to the entire time interval of the signature, with the normalized score compared to the threshold. Alternatively, the normalization procedure could simply express the threshold in matches per unit time. In all of the above examples, the Matching Module 70 may adopt a different threshold score above which a match is declared. Once the matching module 70 has either identified a match or determined that no match has been found, the results may be returned to the client device 62.

The system of FIG. 9 is useful when one has control of the audio signature generation procedure and has to work with a legacy Matching Server, while the system of FIG. 12 is useful when one has control of the matching procedure and has to work with legacy audio signature generation procedures. Although the systems of FIG. 9 and FIG. 12 can provide good results in some situations, further improvement can be obtained if the information about the presence of user generated audio is provided to both the Audio Signature Generator and the Matching Module. To understand this benefit, consider the audio signature algorithm noted above in which a binary matrix is generated from the P % most powerful peaks in the spectrogram and let F^ denote the subset of {1, . . . , F} that corresponds to frames located within regions that were identified by the Audio Analyzer as containing user-generated audio. If F^ is provided only to the Audio Signature Generator, as in the system of FIG. 9, the frames within F^ are nullified to generate the signature, which is then sent to the Matching Server. The nullified portions of the signature avoids the generation of a high matching score with an erroneous program. The resulting matching score may even end up below the minimum matching score threshold, which would result in a missing match. An erroneous match may also happen because the matching server may incorrectly interpret the nullified portions as being silence in an audio signature. In other words, without knowing that portions of the audio signature have been nullified, the matching server may erroneously seek to match the nullified portions with signatures having silence or other low-energy audio during the intervals nullified. On the other hand, if F^ is supplied only to the Matching Server, as described with respect to FIG. 12, the server may determine which segments, if any, are to be nullified, and therefore know not to try to match nullified temporal segments to signatures in a database; however, because the peaks within the frames in F^ are not excluded during the generation of the signature, then most, if not all, of the P % most powerful peaks would be contained within frames that contain user generated audio (i.e., frames in F^) and most, if not all of, the "1"s in the audio signature generated would be concentrated in the frames in F^. Subsequently, as the Matching Module receives the signature and the information about F^, it disregards the parts of the signature contained in the frames in F^. As these frames are disregarded, it may happen that few of the remaining frames in the signature would contain "1"s to be used in the matching procedure, and, again, the matching score is reduced. Ideally, F^ should be provided to both the Audio Signature Generator and the Matching Module. In this case, the Audio Signature Generator can concentrate the distribution of the P % most powerful frames within frames outside F^, and the Matching Module may disregard the frames in F^ and still have enough "1"s in the signature to allow high matching scores. Furthermore, the Matching Module may use the information about the number of frames in F^ to generate the normalization constant to account for the excluded frames in the signature.

Figure 13:
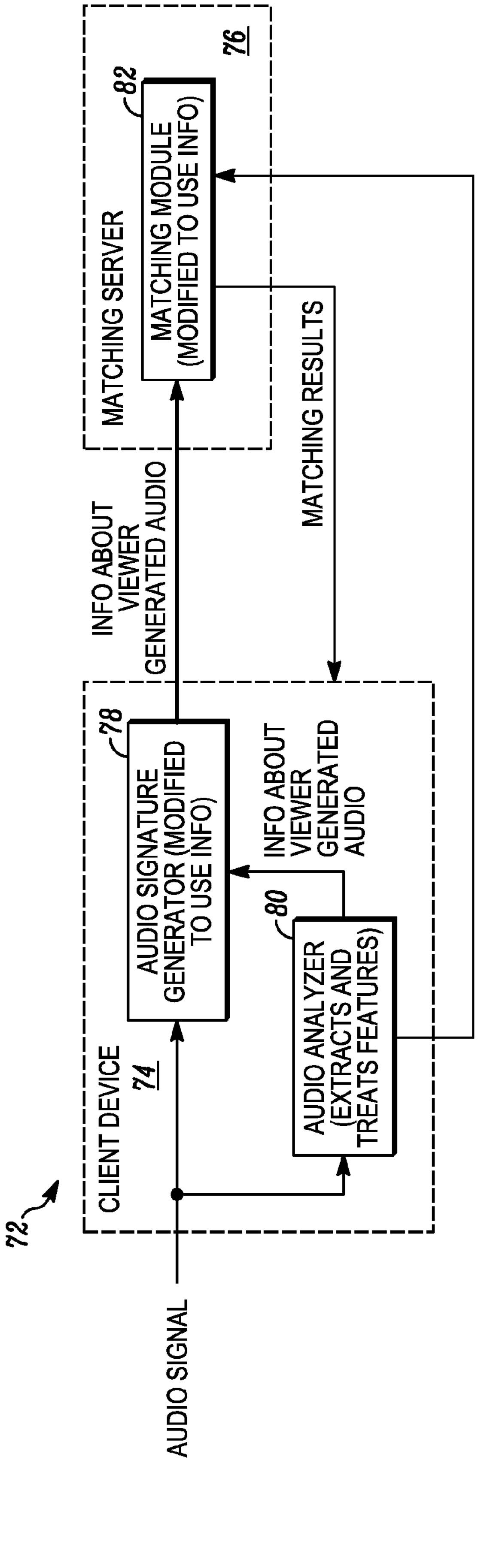
FIG. 13 shows a third first system that corrects for a corrupted audio signature.

FIG. 13 shows another alternate system 72 capable of providing information about user-generated audio to both the Audio Signature Generator and the Matching Module. The system 72 has a client device 74 and a matching server 76. The client device 72 may again be a tablet, a laptop, a PDA, or any other device capable of receiving an audio signal and processing it. The client device 72 preferably includes an audio signature generator 78 and an audio analyzer 80. The audio analyzer 80 processes the audio signal received by one or more microphones 16 integrated with or proximate the client device 72 to identify both the presence and temporal location of any noise, e.g. user generated audio, using the techniques already discussed. The audio analyzer 80 then provides information to both the audio signature generator 78 and to the Matching Module 82. As mentioned before, the microphone 16 may be under control of the audio analyzer 80, which issues commands to activate and deactivate the microphone 16, resulting in the audio signal that is subsequently treated by the Audio Analyzer 80 and Audio Signature Generator 78.

The audio signature generator 78 receives both the audio and the information from the audio analyzer 80. The audio signature generator 78 uses the information from the audio analyzer 80 to nullify the segments with user generated audio when generating a single audio signature, as explained in the description of the system 42 of FIG. 9, and a single signature $S_q$* is then sent by the Audio Signature Generator 78 to the Matching Server 76.

The matching module 82 receives the audio signature $S_q$* from the Audio Signature Generator 78 and receives the information about user-generated audio from the Audio Analyzer 80. This information may be represented by the set F^ of frames located within regions that were identified by the Audio Analyzer 80 as containing user-generated audio. It should be understood that other techniques may be used to send information to the server 76 indicating the existence and location of corruption in an audio signature. For example, the audio signature generator 78 may inform the set F^ to the Matching Module 82 by making all entries in the audio signature $S_q$* equal to "1" over the frames contained in F^; thus, when the Matching Server 76 receives a binary matrix in which a column has all entries marked as "1", it will identify the frame corresponding to such a column as being part of the set F^ of frames to be excluded from the matching procedure.

The matching server 76 is operatively connected to a database storing a plurality of reference audio signatures with which to match the audio signature received by the client device 74. The database may preferably be constructed in the same manner as described with reference to FIG. 2. The matching server 76 preferably includes a matching module 82. The matching module 82 treats the audio signature $S_q$* and the information about the set F^ of frames that contains user generated audio as described in the system 60 of FIG. 12; i.e., the matching module 82 adopts a temporarily different matching score function. Thus, instead of using the operation <Sm*[n], $S_q$*> to compute the score[n,m] of the basic matching procedure as described above, the Matching Module 82 may use an alternative matching operation <Sm*[n], $S_q$*>$_{F^\wedge}$, which disregards the frames in F^ for the matching score computation Alternatively, if a hashing procedure is desired during the matching operation, the procedure described above with respect to FIG. 4 can be modified to consider the user generated audio information as follows. The procedure starts by selecting the bin entry whose corresponding matrix $A_j$ has the smallest Hamming distance to $HS_q$*, where the Hamming distance is now computed considering only the frames outside F^. The matching score is then computed between $S_q$* and all the signatures listed in the entry corresponding to the selected bin. If a high enough score is not found, the process selects next bin in the decreasing order of Hamming distance and the process is repeated until a high enough score is found or a limit in the maximum number of computations is reached.

The process may conclude with either a "no-match" declaration, or the reference signature with the highest score may be declared a match. The results of this procedure may be returned to the client device 74.

Figure 14:
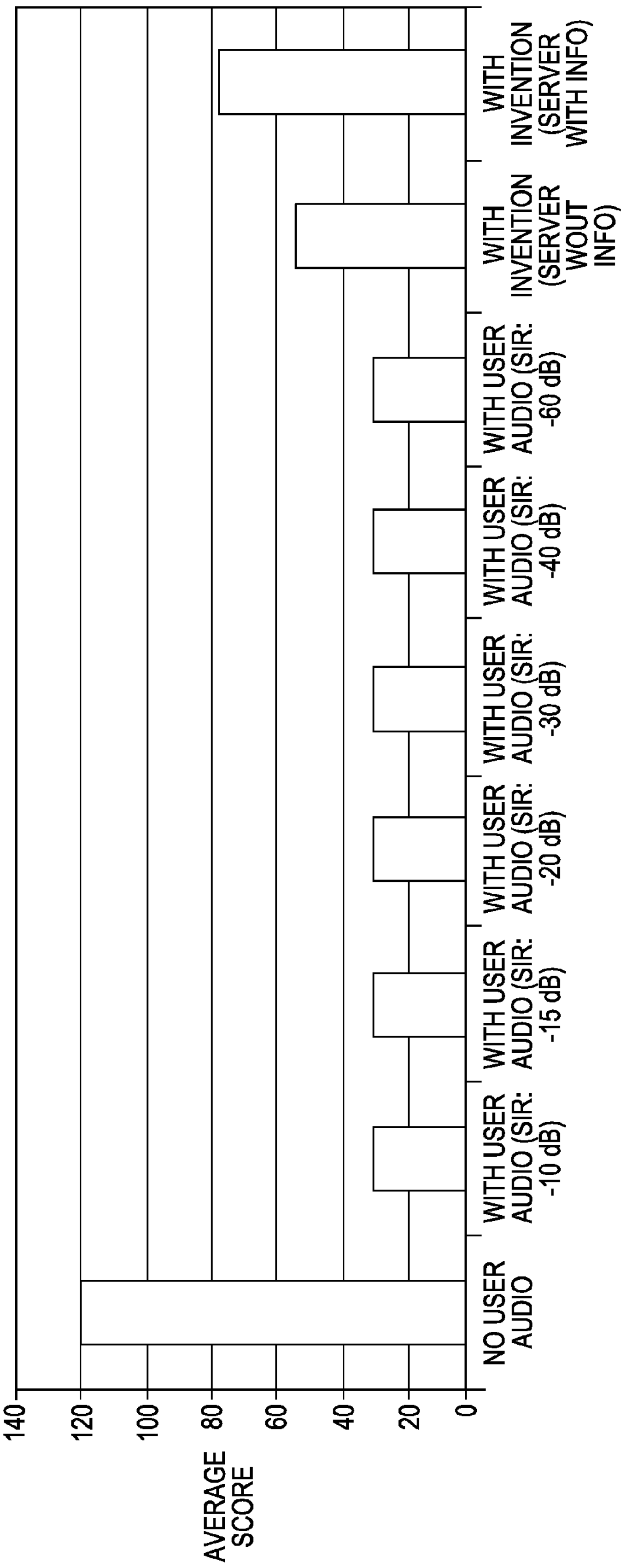
FIG. 14 shows the performance of the system of FIG. 13.

The benefit of providing information to both the Audio Signature Generator 78 and the Matching Module 82 was evaluated in FIG. 14. This evaluation focused on the benefit of having knowledge about the set F^ of frames that contain user generated audio in the Matching Module 82. As explained above, if this information is not available and a signature with nullified entries arrives, then the matching score is reduced given the nullification of portions of the signature. FIG. 14 shows that the average matching score, if the information about F^ is not provided to the Matching Module 82, is around 52 in the scoring scale. When the information about F^ is provided to the Matching Module 82, allowing it to normalize the matching score based on the number of frames within F^, the average matching score increases to around 79. Thus, queries that would otherwise generate a low matching score, which signifies low evidence that the audio capture corresponds to the identified content, would now generate a higher matching score and adjust for the nullified portion of the audio signature.

It should be understood that the system 72 may incorporate many of the features described with respect to the systems 42 and 60 in FIGS. 9 and 12, respectively. As non-limiting examples, the matching module 82 may receive an audio signature that identifies corrupted portions by a series of "1s" and may use those portions to segment the received audio signature into multiple, contiguous signatures, and match those signatures separately to reference signatures in a database. Moreover, considering that the microphone 16 is under control of the Audio Analyzers 48 and 68 of the systems respectively represented in FIGS. 9 and 12, the system 72 may compensate for nullified segments of an audio signature by automatically and selectively extending the temporal length of the audio signature used to query a database by either an interval equal to the temporal length of the nullified portions, or some other interval (and extending the length of the reference audio signatures to which the query signature is compared by a corresponding amount). The extending of the temporal length of the audio signature would be conveyed to both the Audio Signature Generator and the Matching Module, which would extend their respective operations accordingly.

Figure 15:
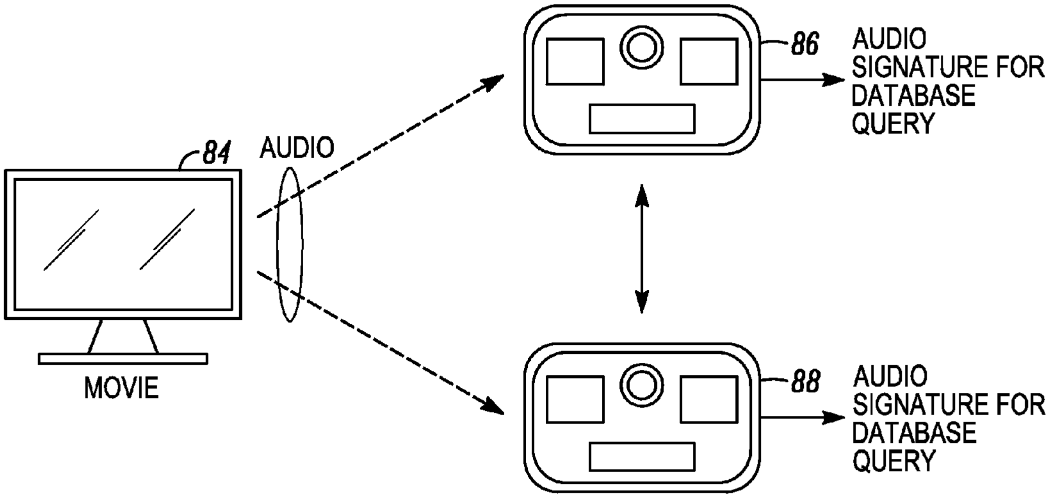
FIGS. 15 and 16 show a fourth system that corrects for a corrupted audio signature.
Figure 16:
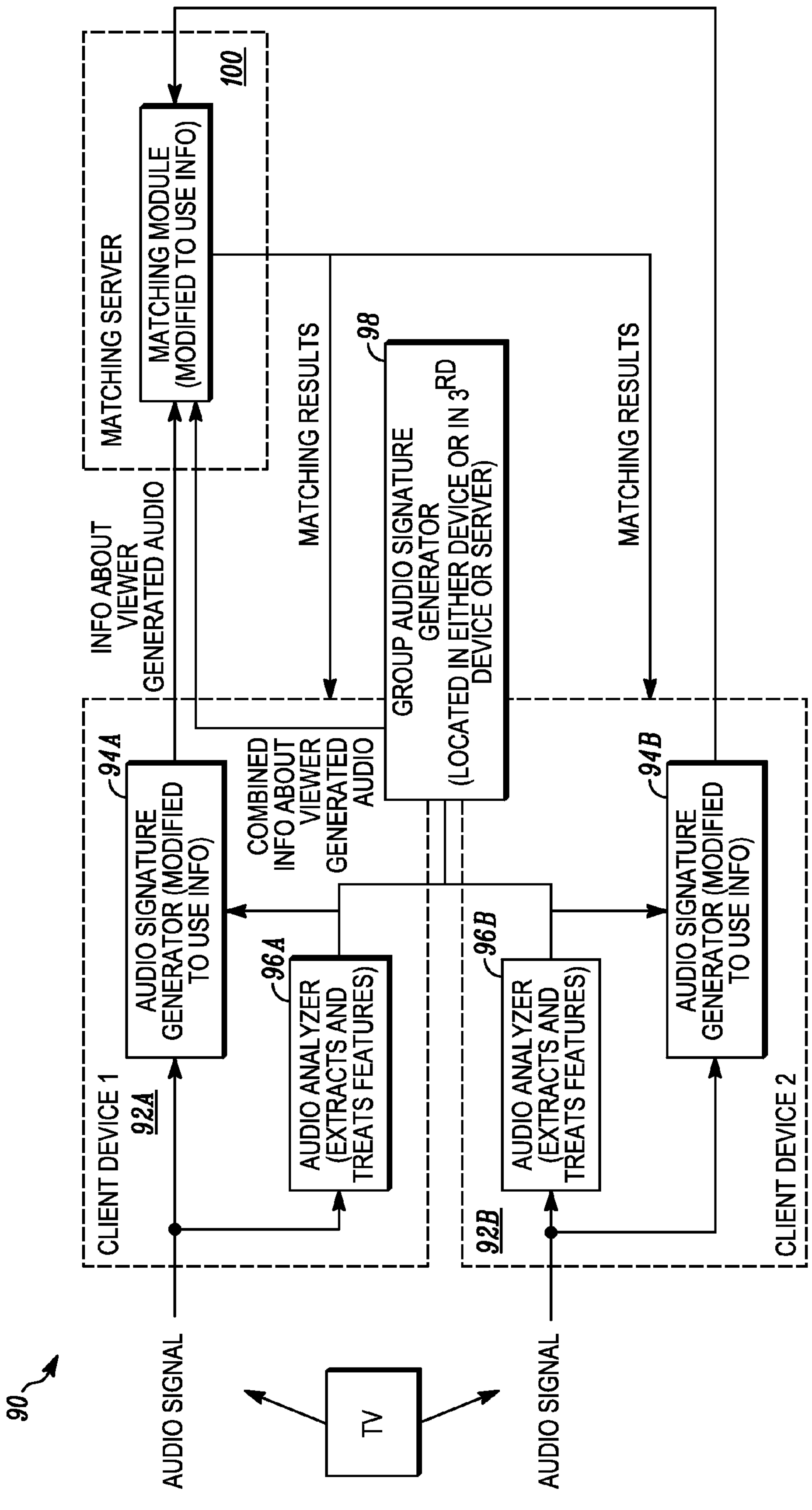

FIGS. 15 and 16 generally illustrate a system capable of improved audio signature generation in the presence of noise in the form of user-generated audio, where two users are proximate to an audio or audiovisual device 84, such as a television set, and where each user has a different device 86 and 88, respectively, which may each be a tablet, laptop, etc., equipped with systems that compensate for corruption (noise) in any of the manners previously described. It has been observed that much user-generated audio occurs when two or more people are engaged in a conversation, during which only one person usually speaks at a time. In such a circumstance, the device 86 or 88, as the case may be, used by the person speaking will usually pick up a great deal more noise than the device used by the person not speaking, and therefore, information about the audio corrupted may be recovered from the device 86 or 88 of the person not speaking.

Specifically, FIG. 16 shows a system 90 comprising a first client device 92*a* and a second client device 92*b*. The client device 92*a* may have an audio signature generator 94*a* and an audio analyzer 96*a*, while the client device 92*b* may have an audio signature generator 94*b* and an audio analyzer 96*b*. Thus, each of the client devices may be able to independently communicate with a matching server 100 and function in accordance with any of the systems previously described with respect to FIGS. 1, 9, 12, and 13. In other words, either of the devices, operating alone, is capable of receiving audio from the device 84, generating a signature with or without the assistance of its internal audio analyzer 96*a* or 96*b*, communicating that signature to a matching server, and receiving a response, using any of the techniques previously disclosed.

In addition, however, the system 90 includes at least one group audio signature generator 98 capable of synthesizing the audio signatures generated by the respective devices 92*a* and 92*b*, using the results of both the audio analyzer 92*a* and the audio analyzer 92*b*. Specifically, the system 90 is capable of synchronizing the two devices 92*a* and 92*b* such that the audio signatures generated by the respective devices encompass the same temporal intervals. With such synchronization, the group audio signature generator 98 may determine whether any portions of an audio signature produced by one device 92*a* or 92*b* have temporal segments analyzed as noise, but where the same interval in the audio signature of the other device 92*a* or 92*b* was analyzed as being not noise (i.e. the signal) and vice versa. In this manner, the group audio signature generator 98 may use the respective analyses of the incoming audio signal by each of the respective devices 92*a* and 92*b* to produce a cleaner audio signature over an interval than either of the devices 92*a* and 92*b* could produce alone. The group audio signature generator 98 may then forward the improved signature to the matching server 100 to compare to reference signatures in a database. In order to perform such a task, the Audio Analyzers 96*a* and 96*b* may forward raw audio features to the group audio signature generator 98 in order to allow it perform the combination of audio signatures and generate the cleaner audio signature mentioned above. Such raw audio features may include the actual spectrograms captured by the devices 92*a* and 92*b*, or a function of such spectrograms; furthermore, such raw audio features may also include the actual audio samples. In this last alternative, the group audio signature generator may employ audio cancelling techniques before producing the audio signature. More precisely, the group audio signature generator 98 could use the samples of the audio segment captured by both devices 92*a* and 92*b* in order to produce a single audio segment that contains less user-generated audio, and produce a single audio signature to be send to the matching module.

The group audio signature generator 98 may be present in either one, or both, of the devices 92*a* and 92*b*. In one instance, each of the devices 92*a* and 92*b* may be capable of hosting the group audio signature generator 98, where the users of the devices 92*a* and 92*b* are prompted through a user interface to select which device will host the group audio signature generator 98, and upon selection, all communication with the matching server may proceed through the selected host device 92*a* or 92*b*, until this cooperative mode is deselected by either user, or the devices 92*a* and 92*b* cease communicating with each other (e.g. one device is turned off, or taken to a different room, etc). Alternatively, an automated procedure may randomly select which device 92*a* or 92*b* hosts the group audio signature generator. Still further, the group audio signature generator could be a stand-alone device in communication with both devices 92*a* and 92*b*. One of ordinary skill in the art will also appreciate that this system could easily be expanded to encompass more than two client devices.

It should also be understood that, in any of the systems of FIG. 9, FIG. 12, FIG. 13, or FIG. 16, an alternative embodiment could locate the Audio Analyzer and the Audio Signature Generator in different devices. In such an embodiment, each of the Audio Analyzer and Audio Signature Generator would have its own microphone and would be able to communicate with each other much in the same manner that they communicate with the Matching Server. In a further alternative embodiment, the Audio Analyzer and the Audio Signature Generator are located in the same device but are separate software programs or processes that communicate with each other.

It should also be understood that, although several of the foregoing systems of matching audio signatures to reference signatures redressed corruption in audio signatures by nullifying corrupted segments, other systems consistent with the present disclosure may use alternative techniques to address corruption. As one example, a client device such as device 14 in FIG. 1, device 44 in FIG. 9, or device 62 in FIG. 12 may be configured to save processing power once a matching program is initially found, by initially comparing subsequent queried audio signatures to audio signatures from the program previously matched. In other words, after a matching program is initially found, subsequently-received audio signatures are transmitted to the client device and used to confirm that the same program is still being presented to the user by comparing that signature to the reference signature expected at that point in time, given the assumption that the user has not switched channels or entered a trick play mode, e.g. fast-forward, etc. Only if the received signature is not a match to the anticipated segment does it become necessary to attempt to first determine whether the user has entered a trick play mode and if not, determine what other program might be viewed by a user by comparing the received signature to reference signatures of other programs. This technique has been disclosed in co-pending application Ser. No. 13/533,309, filed on Jun. 26, 2012 by the assignee of the present application, the disclosure of which is hereby incorporated by reference in its entirety.

Given such techniques, a client device after initially identifying the program being watched or listened by the user, may receive a sequence of audio signatures corresponding to still-to-come audio segments from the program. These still-to-come audio signatures are readily available from a remote server when the program was pre-recorded. However, even when the program is live, there is a non-zero delay in the transmission of the program through the broadcast network; thus, it is still possible to generate still-to-come audio signatures and transmit them to the client device before its matching operation is attempted. These still-to-come audio signatures are the audio signatures that are expected to be generated in the client device if the user continues to watch the same program in a linear manner. Having received these still-to-come audio signatures, the client device may collect audio samples, extract audio features, generate audio signatures, and compare them against the stored, expected audio signatures to confirm that the user is still watching or listening to the same program. In other words, both the audio signature generation and matching procedures are done within the client device during this procedure. Since the audio signatures generated during this procedure may also be corrupted by user generated audio, the methods of the systems in FIG. 9, FIG. 12, or FIG. 13 may still be applied, even though the Audio Signature Generator, the Audio Analyzer, and the Matching Module are located in the client device.

Alternatively, in such techniques, corruption in the audio signal may be redressed by first identifying the presence or absence of corruption such as user-generated audio. If such noise or other corruption is identified, no initial attempt at a match may be made until an audio signature is received where the analysis of the audio indicates that no noise is present. Similarly, once an initial match is made, any subsequent audio signatures containing noise may be either disregarded, or alternatively may be compared to an audio signature of a segment anticipated at that point in time to verify a match. In either case, however, if a "no match" is declared between an audio signature corrupted by, e.g. noise, a decision on whether the user has entered a trick play mode or switched channels is deferred until a signature is received that does not contain noise.

It should also be understood that, although the foregoing discussion of redressing corruption in an audio signature was illustrated using the example of user-generated audio that introduced noise in the signal, other forms of corruption are possible and may easily be redressed using the techniques previously described. For example, satellite dish systems that deliver programming content frequently experience brief signal outages due to high wind, rain, etc. and audio signals may be briefly sporadic. As another example, if programming content stored on a DRV or played on a DVD is being matched to programming content in a database, the audio signal may be corrupted due to imperfections digital storage media. In any case, however, such corruption can be modelled and therefore identified and redressed as previously disclosed.

It will be appreciated that the disclosure is not restricted to the particular embodiment that has been described, and that variations may be made therein without departing from the scope of the disclosure as well as the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An apparatus comprising:

a microphone capable of receiving a local audio signal comprising primary audio and extraneous audio, the primary audio from a device that outputs media content to one or more users, and the extraneous audio comprising audio that is extraneous to said primary audio;

at least one processor, communicatively coupled to a transmitter, the at least one processor configured to:

(i) analyze said received local audio signal to identify a presence or absence of corruption in the received local audio signal;

(ii) generate an audio signature of the received local audio signal over a temporal interval based on the identified presence or absence of corruption in the received local audio signal;

(iii) modify and said processor modifies said audio signature by nullifying those portions of said audio signature corrupted by said extraneous audio; and (iv) communicate said audio signature, via the transmitter, to a server; and a receiver, communicatively coupled to the at least one processor, and capable of receiving a response from said server, said response based on said audio signature and said presence or absence of corruption.

2. The method of claim 1, wherein said extraneous audio is user-generated audio.

3. The apparatus of claim 1, wherein said at least one processor is further configured to identify said extraneous audio based on at least one of: (i) an energy threshold; (ii) a change in spectrum characteristics of the received local audio signal; and (iii) a speaker detector that indicates a presence of a known user's speech in the received local audio signal.

4. The apparatus of claim 1, wherein said at least one processor is further configured to, via the transmitter, communicate to said server which portions of said temporal interval are associated with corruption in the received local audio signal.

5. The apparatus of claim 1, wherein after the audio signature has been modified, said server is capable of using said audio signature to identify a content viewed by said user from among a plurality of content in a database.

6. The apparatus of claim 1, wherein said at least one processor is further configured to generate a plurality of audio signatures over said temporal interval, each audio signature associated with a continuous selected portion of said temporal interval.

7. The apparatus of claim 1, wherein said at least one processor is further configured to extend a period in which an audio signal is collected by said microphone based on a duration of corruption identified by said at least one processor.

8. The apparatus of claim 1, wherein at least one of a start time of the temporal interval, an end time of the temporal interval, and a duration of the temporal interval are selectively adjusted responsively to said presence or absence of corruption.

9. The apparatus of claim 5, wherein said receiver receives complementary content from said server based on said server matching said audio signature to content in said database.

10. An apparatus comprising:

at least one processor capable of searching a plurality of reference audio signatures, each said reference audio signature associated with an audio or audiovisual program available to a user on a presentation device; and a receiver, communicatively coupled to the at least one processor, the receiver configured to:

receive a query audio signature from a processing device proximate said user;

receive a message indicating a presence of corruption in said query audio signature; and identify, using said message and said query audio signature, a content being watched by said user;

wherein said query audio signature encompasses an interval from a first time to a second time, and said message is used by said at least one processor to indicate selective portions of said query audio signature to match to at least one of said reference audio signatures.

11. The apparatus of claim 10, wherein said message is used to nullify intervals within said reference audio signatures when matching said query audio signature to said at least one of said reference audio signatures.

12. The apparatus of claim 10, wherein said message is used by said at least one processor to selectively delay identification of said program being watched by said user until at least one other said query audio signature is received.

13. The apparatus of claim 10, wherein said apparatus receives at least one query audio signature and identifies said content being watched by said user by, in the at least one processor:

(a) comparing each said query audio signature to a reference audio signature;

(b) generating respective scores for said at least one query audio signature based on a comparison to said reference audio signature, and adding said scores to obtain a total score;

(c) repeating steps (a) and (b) for at least one other reference audio signature; and (d) identifying as said content being watched by said user, an audio or audiovisual program segment associated with the reference audio signature causing the highest total score.

14. The apparatus of claim 10, wherein said apparatus receives at least one query audio signature and identifies said content being watched by said user by, in the at least one processor:

(a) comparing each said at least one query audio signature to a reference audio signature;

(b) generating respective scores for said at least one query audio signature based on a comparison to a target said reference audio signature, and adding said scores to obtain a total score;

(c) if said total score exceeds a threshold, identifying as said content being watched by said user, an audio or audiovisual program segment associated with the reference audio signature causing said score to exceed said threshold as said content being watched by said user;

(d) if said total score does not exceed said threshold, designating another reference audio signature in said database as the target reference audio signature and repeating steps (a) and (b) until either said total score exceeds said threshold or all programs in said database have been designated.

15. The apparatus of claim 10, wherein said at least one processor is configured to use a plurality of scores to identify said content being watched by said user, said scores generated by comparing said query audio signature to said reference audio signatures, and wherein said scores are normalized based on information within said message.

16. The apparatus of claim 10, wherein each of said reference audio signatures has a temporal length and wherein said at least one processor is capable of extending said length based on said message.

17. An apparatus comprising:

a transmitter configured to be communicatively coupled to a server; and at least one processor communicatively coupled to the transmitter, wherein the at least one processor is configured to:

(a) receive a first sequence of audio features from a first apparatus corresponding to a first audio signal collected by a first microphone from an audio device;

(b) receive a second sequence of audio features from a second apparatus corresponding to a second audio signal collected by a second microphone from the said audio device;

(c) use the first and the second audio features to (i) identify a presence or absence of corruption in the first audio signal; (ii) identify a presence or absence of corruption in the second audio signal; and (iii) generate an audio signature of the audio produced by said audio device based on the identified presence or absence of corruption in each of the first and second audio signals; and (d) communicate said audio signature, via the transmitter, to the server.

18. A method comprising:

(a) receiving an audio signal from a device presenting content to a user proximate a device having a processor;

(b) identifying selective portions of said audio as being corrupted;

(c) using said audio and said identification to generate at least one query audio signature of the received said audio;

(d) comparing said at least one query audio signature to a plurality of reference audio signatures each representative of a segment of content available to said user, said plurality of reference audio signatures at a location remote from said device, said comparison based on the selective identification of corruption in said at least one query audio signature;

(e) based on said comparison, sending supplementary content to said device from said location remote from said device; and (f) sending a message to said location remote from said device indicating that some temporal portions of said query audio signature are corrupted.

19. The method of claim 18, wherein said query audio signature is generated by nullifying corrupted portions of said query audio signature.

20. The method of claim 18 where said message is embedded in said query audio signature.

21. The method of claim 18 where said message is used to selectively delay said comparison until at least one other said query audio signature is received.

22. An apparatus comprising:

at least one microphone capable of receiving an audio signal comprising primary audio from a device that outputs media content to one or more users, said audio signal corrupted by user-generated audio; and at least one processor that:

(i) generates a first audio signature of a received said audio signal;

(ii) analyzes the received said audio signal to identify at least one interval in the received said audio signature not corrupted by said user-generated audio:

(iii) uses the identified said at least one interval to match said first audio signature to a second audio signature stored in a database; and (iv) synchronizes said first audio signature with said primary audio based on the match to said second audio signature.

* * * * *